(12) United States Patent
Guerrero et al.

(10) Patent No.: US 11,143,565 B2
(45) Date of Patent: Oct. 12, 2021

(54) REUSABLE PIPE INTEGRITY TEST HEAD SYSTEMS AND METHODS

(71) Applicant: Trinity Bay Equipment Holdings, LLC, Houston, TX (US)

(72) Inventors: Jonathan Guerrero, Houston, TX (US); Richard Limas, League City, TX (US); Max Allen Reedy, Kemah, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/159,235

(22) Filed: Jan. 27, 2021

(65) Prior Publication Data

US 2021/0270689 A1     Sep. 2, 2021

Related U.S. Application Data

(60) Provisional application No. 62/983,499, filed on Feb. 28, 2020.

(51) Int. Cl.
*G01M 3/02*     (2006.01)
*G01N 3/12*     (2006.01)

(52) U.S. Cl.
CPC .............. *G01M 3/022* (2013.01); *G01N 3/12* (2013.01)

(58) Field of Classification Search
CPC ........... G03G 3/02; G03G 3/022; G01M 3/02; G01M 3/022
See application file for complete search history.

(56) References Cited

U.S. PATENT DOCUMENTS

| 4,342,336 A | 8/1982 | Satterthwaite et al. |
| 4,407,171 A | 10/1983 | Hasha et al. |
| 4,602,500 A * | 7/1986 | Kelly ............. G01M 3/022 138/90 |
| 5,797,431 A * | 8/1998 | Adams ............. F16L 55/136 138/89 |
| 6,966,343 B1 * | 11/2005 | Field .............. F16L 55/1283 138/89 |
| 2006/0086400 A1 | 4/2006 | Beebe et al. |
| 2014/0326324 A1 | 11/2014 | Berube et al. |
| 2020/0056431 A1 | 2/2020 | Pusard |

FOREIGN PATENT DOCUMENTS

JP       58019531 A *   2/1983   ........... G01M 3/283

OTHER PUBLICATIONS

International Search Report and Written Opinion for PCT/US2021/019737 dated Apr. 27, 2021.

* cited by examiner

*Primary Examiner* — Erika J Villaluna
(74) *Attorney, Agent, or Firm* — Conrad J. Hsu

(57) ABSTRACT

Techniques for implementing a system including a pipe segment and a test head. The test head includes a shell that defines an annulus cavity to be used to interface with an annulus of the pipe segment, in which the shell includes a bore insert having a male taper to be inserted into a pipe bore of the pipe segment, a testing port that extends through the shell and fluidly coupled to the annulus cavity, and an internal clamp assembly including clamp segments having a female taper that slidably interface with the male taper of the bore insert, in which an outer surface diameter of the clamp segments is controlled by position of the clamp segments on the bore insert to facilitate selectively securing and sealing an open end of the pipe segment in the test head to enable integrity of the tubing to be tested.

12 Claims, 9 Drawing Sheets

REUSABLE PIPE INTEGRITY TEST HEAD SYSTEMS AND METHODS

CROSS-REFERENCE

The present disclosure claims priority to and benefit of U.S. Provisional Application No. 62/983,499, entitled "REUSABLE PIPE INTEGRITY TEST HEAD SYSTEMS AND METHODS," filed Feb. 28, 2020, which is incorporated herein by reference in its entirety for all purposes.

BACKGROUND

The present disclosure generally relates to pipeline systems and, more particularly, to a test head, which may be coupled to a pipe segment deployed in or to be deployed in a pipeline system, to facilitate testing the integrity of the pipe segment.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments, for example, in addition to one or more pipe (e.g., midline and/or end) fittings (e.g., connectors) used to couple a pipe segment to another pipe segment, to a fluid source, and/or to a fluid destination. Generally, a pipe segment may include tubing, which defines (e.g., encloses) a bore that provides a primary fluid conveyance (e.g., flow) path through the pipe segment. More specifically, the tubing of a pipe segment may be implemented to facilitate isolating (e.g., insulating) fluid being conveyed within its bore from environmental conditions external to the pipe segment, for example, to reduce the likelihood of the conveyed (e.g., bore) fluid being lost to the external environmental conditions and/or the external environmental conditions contaminating the conveyed fluid.

However, at least in some instances, the presence of one or more defects, such as a breach, a kink, and/or a dent, on the tubing of a pipe segment may affect (e.g., reduce and/or compromise) its integrity and, thus, its ability to provide isolation (e.g., insulation). In other words, at least in some instances, operating a pipeline system while a pipe segment deployed therein has an integrity-compromising defect may affect (e.g., reduce) operational efficiency and/or operational reliability of the pipeline system, for example, due to the defect resulting in conveyed fluid being lost and/or contaminated by external environmental conditions. As such, to facilitate improving pipeline system operational efficiency and/or operational reliability, the integrity of one or more pipe segments deployed in or to be deployed in a pipeline system may be tested, for example, before beginning and/or resuming normal operation of the pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe segment, in which the pipe segment includes tubing that defines a pipe bore and a fluid conduit implemented in an annulus of the tubing, and a test head. The test head includes a shell that defines an annulus cavity that interfaces with the annulus of the tubing, in which the shell includes a bore insert having a male taper to be inserted into the pipe bore defined by the tubing of the pipe segment, a testing port that extends through the shell of the test head and fluidly coupled to the annulus cavity of the test head, and an internal clamp assembly including one or more clamp segments having a female taper that slidably interface with the male taper of the bore insert, in which an outer surface diameter of the one or more clamp segments is controlled by position of the one or more clamp segments on the bore insert of the shell to facilitate selectively securing and sealing an open end of the pipe segment in the test head to enable integrity of the tubing to be tested at least in part by flowing a test fluid into the fluid conduit implemented in the annulus of the tubing via the testing port.

In another embodiment, a method of implementing a pipeline system, includes inserting a testing port and a portion of a shell of a test head into a pipe bore defined by pipe segment tubing, in which the portion of the shell includes a coned bore insert and the pipe segment tubing includes a fluid conduit implemented in an annulus of the pipe segment tubing, maintaining a reusable fastener mechanism of the test head in a deactivated state while the reusable fastener mechanism is being inserted into the pipe bore defined by the pipe segment tubing at least in part by maintaining wedged clamp segments of the reusable fastener mechanism at a first position on the coned bore insert that results in an outer surface diameter of the wedged clamp segments being less than a default inner surface diameter of the pipe segment tubing, and transitioning the reusable fastener mechanism from the deactivated state to an activated state to facilitate securing an open end of the pipe segment tubing in an annulus cavity defined by the shell of the test head at least in part by transitioning the wedged clamp segments from the first position to a second position on the coned bore insert that results in the outer surface diameter of the wedged clamp segments being greater than or equal to the default inner surface diameter of the pipe segment tubing to enable integrity of the pipe segment tubing to be tested based at least in part on a fluid parameter change resulting from supply of a test fluid to the fluid conduit in the annulus of the pipe segment tubing via a testing port that opens through the shell of the test head.

In another embodiment, a reusable test head includes a shell that defines an annulus cavity to be used to interface with pipe segment tubing, in which the shell includes a coned bore insert to be inserted into a pipe bore defined by the pipe segment tubing and an end cap to be used to externally cover an open end of the pipe segment tubing, wedged clamp segments that slidably interface with the coned bore insert of the shell, and a testing port to be fluidly coupled to the annulus cavity of the reusable test head. The testing port includes port tubing that extends through an opening between the wedged clamp segments, the coned bore insert, and the end cap. The reusable test head expands an outer surface diameter of the wedged clamp segments outwardly when the wedged clamp segments are moved to cover more of the coned bore insert to facilitate securing the open end of the pipe segment tubing in the annulus cavity to enable integrity of the pipe segment tubing to be tested at least in part by flowing fluid between the testing port and a fluid conduit implemented within the pipe segment tubing.

DETAILED DESCRIPTION

Figure 1:
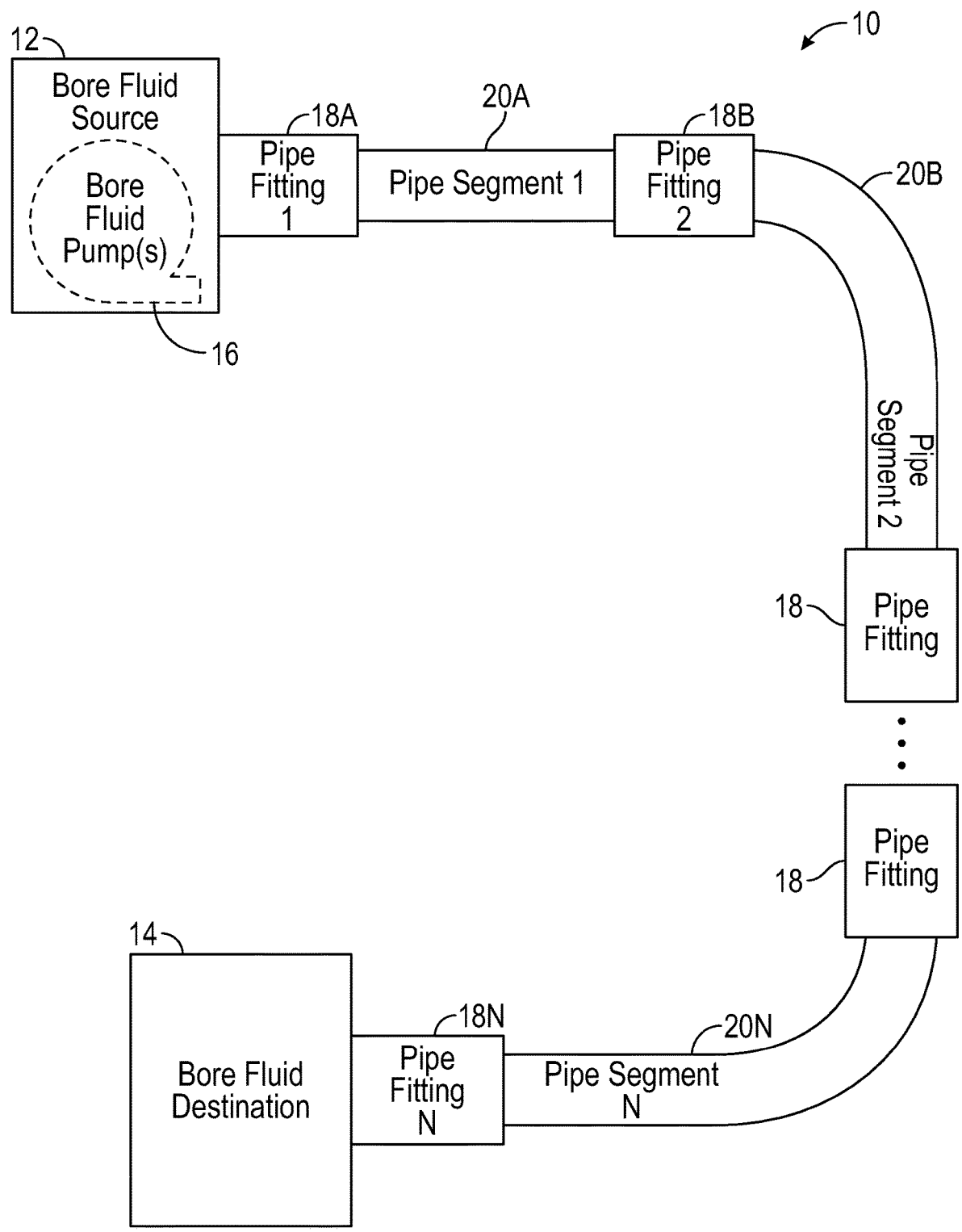
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features.

The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments. Merely as an illustrative non-limiting example, a pipeline system may include a first pipe end fitting that couples a first pipe segment to a fluid source, a midline pipe fitting that couples the first pipe segment to a second pipe segment, and a second pipe end fitting that couples the second pipe segment to a fluid destination.

In any case, a pipe segment generally includes tubing, which defines (e.g., encloses) a pipe bore that provides a primary fluid conveyance (e.g., flow) path through the pipe segment. More specifically, the tubing of a pipe segment may be implemented to facilitate isolating environmental conditions external to the pipe segment from conditions within its bore and, thus, fluid that flows therethrough. In particular, the tubing of a pipe segment may primarily be implemented to block fluid flow directly between the bore of the pipe segment and its external environmental conditions, for example, in addition to providing thermal, pressure, and/or electrical isolation (e.g., insulation).

To facilitate providing fluid isolation, in some instances, the tubing of a pipe segment may be implemented with multiple layers. For example, the tubing of a pipe segment may include an inner (e.g., innermost) layer (e.g., liner or sheath) and an outer (e.g., outermost) layer (e.g., shield or sheath) that each run (e.g., span) the length of the pipe segment. To facilitate blocking fluid flow directly therethrough, the inner layer and the outer layer may each be a continuous layer of solid material, such as plastic and/or a composite material, that runs the length of the pipe segment.

In some instances, pipe segment tubing may additionally include one or more intermediate layers implemented between its inner layer and its outer layer, for example, to facilitate improving tensile strength of the pipe segment tubing. Additionally, to facilitate improving deployment (e.g., installation) efficiency, in some instances, an intermediate layer of pipe segment tubing may include solid material, such as metal and/or a composite material, with one or more openings devoid of solid material. In other words, in such instances, the intermediate layer may have one or more gaps in which the solid material is not implemented and, thus, included in the annulus of the pipe segment tubing. Due to the reduced amount of solid material, at least in some instances, implementing an intermediate layer of pipe segment tubing with one or more openings may facilitate improving flexibility of the pipe segment, for example, to facilitate reducing its minimum bend radius (MBR). In fact, at least in some instances, a flexible pipe segment may be spooled (e.g., on a reel and/or in a coil) and, thus, increasing its flexibility may facilitate improving deployment efficiency, for example, by enabling the pipe segment to be transported and/or deployed using a tighter spool.

Nevertheless, in some instances, a defect, such as a breach, a kink, and/or a dent, on pipe segment tubing may affect (e.g., compromise and/or reduce) its integrity and, thus, its ability to provide isolation (e.g., insulation) between the pipe bore of a corresponding pipe segment and environmental conditions external to the pipe segment. For example, a defect on the tubing of a pipe segment may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has an integrity-compromising defect may affect (e.g., reduce) operational efficiency and/or operational reliability of the pipeline system, for example, due to the defect resulting in conveyed fluid being lost and/or contaminated by external environmental conditions.

As such, to facilitate improving operational efficiency and/or operational reliability of a pipeline system, the integrity of one or more pipe segments deployed in or to be deployed in the pipeline system may be tested, for example, via a testing process performed by a testing system before beginning and/or resuming normal operation of the pipeline system. In fact, to facilitate testing pipe segment integrity, in some instances, one or more openings (e.g., gaps) in an intermediate layer (e.g., annulus) of pipe segment tubing may each be implemented such that it runs the length of a corresponding pipe segment, thereby providing a fluid conduit (e.g., paths) through which fluid can flow within the pipe segment tubing. In fact, in such instances, an outer layer of the pipe segment tubing may facilitate isolating conditions within the tubing annulus (e.g., fluid conduit implemented in one or more intermediate layers) from environmental conditions external to the pipe segment while an inner layer of the pipe segment tubing may facilitate isolating the conditions within the tubing annulus from conditions within the bore of the pipe segment. In other words, in such instances, the pipe segment may be implemented to enable fluid flow in its bore as well as fluid flow in the annulus of its tubing.

Leveraging this fact, in some instances, a testing process and/or a testing system may test integrity of pipe segment tubing at least in part by injecting (e.g., supplying and/or pumping) test fluid into the annulus of the pipe segment tubing and determining one or more fluid parameters that result downstream due to the test fluid injection, for example, via one or more test fluid sources (e.g., pumps and/or compressed air tanks) and one or more sensors, respectively. Merely as an illustrative non-limiting example, the one or more downstream fluid parameters may include a downstream fluid temperature determined (e.g., measured and/or sensed) by a temperature sensor. Additionally or alternatively, the one or more downstream fluid parameters may include a downstream fluid pressure determined by a pressure sensor, a downstream fluid composition (e.g., constituent percentages) determined by a fluid composition sensor, or both.

Furthermore, in some instances, the test fluid used by a testing process and/or a testing system may be an inert fluid, such as nitrogen (e.g., $N_2$) gas, for example, to facilitate reducing the likelihood that the test fluid itself affects (e.g., compromises and/or corrodes) integrity of pipe segment tubing. Moreover, in some instances, one or more fluid parameters of the test fluid may be pre-determined, for example, offline by a test lab and/or a fluid supplier. Additionally or alternatively, one or more fluid parameters of the test fluid may be determined while the test fluid is being supplied to the annulus of the pipe segment tubing being tested, for example, online and/or in real-time via one or more sensors.

In other words, a fluid parameter of the test fluid may be an upstream fluid parameter and, thus, comparison with a corresponding downstream fluid parameter may indicate the change in the fluid parameter that results from fluid flow through the annulus (e.g., fluid conduit implemented in an intermediate layer) of pipe segment tubing. As described above, pipe segment tubing may generally be implemented to provide isolation, such as thermal isolation (e.g., insulation), fluid flow isolation, and/or pressure isolation, and, thus, facilitates reducing the amount fluid parameters change due to fluid flow therein. Although some amount of change in a fluid parameter may nevertheless occur, the change may generally be predictable, for example, based at least in part on a model, empirical testing, external environmental conditions, fluid parameters of the injected test fluid, implementation parameters, such as material and/or thickness, of the pipe segment tubing, or any combination thereof.

In other words, at least in some instances, an unexpected change in downstream fluid parameters may indicate that the integrity of a pipe segment is compromised by one or more defects, such as a dent, a kink, and/or a breach. For example, an unexpected change (e.g., drop) in downstream fluid pressure relative to pressure of injected test fluid may be indicative of fluid leaking from the tubing annulus of a pipe segment and, thus, that the pipe segment is potentially faulty (e.g., defective). Additionally, an unexpected change (e.g., increase or decrease) in downstream fluid temperature relative to temperature of injected test fluid may be indicative of increased heat transfer between fluid in the annulus of pipe segment tubing and conditions external to the pipe segment tubing and, thus, that the pipe segment tubing is potentially faulty and/or that the external (e.g., environmental and/or bore) conditions will potentially shorten the lifespan of the pipe segment tubing. Furthermore, an unexpected change in downstream fluid composition relative to composition of injected test fluid may be indicative of conditions external to pipe segment tubing contaminating fluid in its tubing annulus and, thus, that the pipe segment tubing is potentially faulty.

As such, at least in some instances, efficacy (e.g., accuracy) of an integrity test for pipe segment tubing may be premised on its tubing annulus (e.g., one or more fluid conduits implemented in one or more of its intermediate layers) being fluidly isolated from conditions external to the pipe segment tubing. To facilitate providing fluid isolation, an open end of pipe segment tubing may be secured in a test head that seals the open end of the pipe segment tubing and, thus, its tubing annulus. In some instances, a test head may be secured to pipe segment tubing using swaging techniques. For example, in some such instances, an open end of the pipe segment tubing may be inserted into a shell (e.g., body) of the test head and a swage machine may then compress the test head shell such that resulting deformation on an inner surface of the test head shell conforms with resulting deformation on an outer surface of the pipe segment tubing, thereby securing and sealing the open end of the pipe segment tubing in the test head.

However, at least in some instances, securing a test head to a pipe segment using swaging techniques may affect (e.g., reduce) testing efficiency for a pipeline system. For example, at least in some instances, the conformal deformation of a test head shell and pipe segment tubing produced by swaging techniques may result in the test head effectively being permanently coupled to the pipe segment. Thus, at least in some such instances, the test head and a portion of the pipe segment secured in the test head may be cut off before the pipe segment is deployed in and/or used in normal operation of the pipeline system. Moreover, even when the portion of a pipe segment secured to a test head is removable from the test head, at least in some instances, deformation of the test head shell may limit the ability of the test head to be reused for testing the integrity of another pipe segment. In other words, at least in some instances, a test head secured using swaging techniques may effectively be a one-time-use (e.g., sacrificial) test head and, thus, potentially limit testing efficiency for a pipeline system, for example, due to at least one new (e.g., different) test head being used to test the integrity of each pipe segment deployed in or to be deployed in the pipeline system.

Accordingly, to facilitate improving testing efficiency for pipeline systems, the present disclosure provides techniques for implementing and/or operating a reusable test head that may be utilized in a testing system and/or during a testing process. As described above, integrity testing for pipe segment tubing may be premised on an open end of its annulus (e.g., one or more fluid conduits implemented in one or more of its intermediate layers) being isolated from conditions external to the pipe segment tubing. Thus, to facilitate testing integrity, the reusable test head may include a shell implemented to define (e.g., enclose) an annulus (e.g., tubing) cavity in which an open end of pipe segment tubing and, thus, its annulus is to be secured and sealed. For example, in some embodiments, a reusable test head shell may include an end cap, which is implemented to externally cover an open end of pipe segment tubing, and a bore insert, which is implemented to be inserted into a pipe bore defined (e.g., enclosed) by the pipe segment tubing.

Additionally, to facilitate testing integrity, in some embodiments, a reusable test head may include one or more testing ports (e.g., openings and/or tubes) that open through its shell to enable supply of fluid, such as a test fluid, into its annulus cavity and/or extraction of fluid from its annulus cavity. In particular, in some embodiments, a testing port of a reusable test head may be fluidly coupled to one or more test fluid sources (e.g., pumps and/or compressed air tanks), which are implemented and/or operated to selectively supply (e.g., inject and/or pump) test fluid into the annulus cavity, for example, via one or more test fluid injection conduits. Additionally or alternatively, the testing port may be fluidly coupled to one or more external sensors, which are implemented and/or operated to determine (e.g., measure and/or sense) one or more fluid parameters (e.g., temperature, pressure, and/or composition) of fluid extracted from its annulus cavity, for example, via one or more fluid extraction conduits.

In fact, in some embodiments, the same testing port may be selectively used for different purposes. For example, a testing port may be fluidly coupled to one or more test fluid sources (e.g., pumps and/or compressed air tanks) and, thus, dedicated for test fluid injection during a first time period while being fluidly coupled to one or more external sensors and, thus, dedicated for fluid parameter determination during a second (e.g., subsequent and/or non-overlapping) time period. In some embodiments, one or more sensors may additionally or alternatively be implemented internal to a reusable test head shell and/or proximate (e.g., directly adjacent) to the tubing annulus of a pipe segment.

To facilitate fluid flow into and/or out from an annulus cavity of a reusable test head, in some embodiments, a testing port of the reusable test head may include port tubing that is implemented to extend through the shell of reusable test head. In particular, in some embodiments, the port tubing may be implemented to extend through a bore insert and an end cap of the reusable test head shell such that a closed (e.g., blind flanged) end of the port tubing is on a first (e.g., internal) side of the bore insert while an open end of the port tubing extends through to a second (e.g., external and/or opposite) side of the end cap. Additionally, in such embodiments, the testing port may include one or more port openings, which open through the port tubing to the annulus cavity to facilitate fluidly coupling a port bore defined (e.g., enclosed) by the port tubing with the annulus cavity.

However, in other embodiments, a testing port may be obviated and, thus, not included in a reusable test head, for example, when another reusable test head coupled or to be coupled to an opposite end of a pipe segment includes a testing port. Merely as an illustrative non-limiting example, in some such embodiments, the testing port may be replaced with a cylindrical component, such as a bolt, for example, when the reusable test head includes one or more separate testing ports that open through its end cap. However, to help streamline discussion, the techniques of the present disclosure are primarily described with regard to testing port embodiments. Nevertheless, it should be appreciated that the techniques described in the present disclosure may be additionally or alternatively implemented using a different type of cylindrical component in place of a testing port.

To facilitate selectively securing pipe segment tubing in its annulus cavity, a reusable test head may include one or more reusable fastener mechanisms coupled to its shell, for example, instead of a swaged (e.g., one-time use and/or sacrificial) fastener mechanism and/or via a testing port that extends through the reusable test head shell. In particular, in some embodiments, a reusable fastener mechanism of a reusable test head may include an internal clamp assembly. As will be described in more detail below, in some embodiments, the internal clamp assembly may include one or more clamp segments, for example, held together via a garter belt that runs circumferentially along an outer surface of the one or more clamp segments.

Additionally, in some embodiments, a clamp segment of an internal clamp assembly may be implemented to slidably interface with a bore insert of a corresponding reusable test head shell. In particular, in some embodiments, one or more clamp segments may be implemented with a female taper and, thus, a wedge-shaped axial cross-section profile, for example, with one or more teeth (e.g., serrations and/or threads) that extend from its outer surface. On the other hand, the bore insert may be implemented with a male taper and, thus, a cone-shaped axial cross-section profile. In other words, in such embodiments, a wedged clamp segment may be implemented to at least partially cover the coned bore insert such that a diagonal (e.g., inner) surface of the wedged clamp segment can slide along an outer surface of the coned bore insert, for example, when external force is applied to the wedged clamp segment.

In fact, due to the taper slopes, the activation state of an internal clamp assembly may be controlled at least in part by controlling the position of one or more of its wedged clamp segments on the coned bore insert of a corresponding reusable test head shell. In particular, in some embodiments, an internal clamp assembly may be in an activated state when an outer surface diameter of its one or more wedged clamp segments is greater than or equal to (e.g., not less than) a default (e.g., natural, original, and/or uncompressed) inner surface diameter of pipe segment tubing secured or to be secured in the annulus cavity of a reusable test head. On the other hand, the internal clamp assembly may be in a deactivated state when the outer surface diameter of its one or more wedged clamp segments is less than the default outer surface diameter of the pipe segment tubing. In other words, in such embodiments, the internal clamp assembly may be in a deactivated state when its one or more wedged clamp segments are at a first (e.g., deactivated) position on the coned bore insert that results in the outer surface diameter of its one or more wedged clamp segments being less than the default inner surface diameter of the pipe segment tubing, which, at least in some instances, may facilitate reducing the resistance (e.g., force) the internal clamp assembly and, thus, the reusable test head exerts against movement of the pipe segment tubing.

Moreover, due to the taper slopes, at least in some instances, transitioning one or more wedged clamp segments of a reusable test head to a different position on the coned bore insert of a corresponding reusable test head shell may affect (e.g., expand or contract) the outer surface diameter of the one or more wedged clamp segments. To help illustrate, continuing with the above example, moving (e.g., transitioning) the one or more wedged clamp segment from the first position to a second (e.g., activated) position, which covers more of the coned bore insert, may expand (e.g., stretch) the outer surface of one or more wedged clamp segments outwardly, for example, such that the outer surface diameter of the one or more wedged clamp segments is increased to match or even exceed the default inner surface diameter of the pipe segment tubing, thereby transitioning the internal clamp assembly to its activated state. In other words, when the pipe segment tubing is present therein, moving the one or more wedged clamp segments to the second position may result in the outer surface (e.g., one or more teeth) of the one or more wedged clamp segments engaging (e.g., contacting) the inner surface of the pipe segment tubing, thereby increasing the resistance (e.g., force) the internal clamp assembly and, thus, the reusable test head exerts against movement of the pipe segment tubing.

To facilitate controlling position of a wedged clamp segment on a corresponding coned bore insert, in some embodiments, the wedged clamp segment of a reusable test head may be implemented to be coupled between the coned bore insert and an internal (e.g., first) threaded fastener, such as a nut. In particular, in such embodiments, the internal threaded fastener may include fastener threading that is implemented to matingly interface with port threading on a testing port of the reusable test head. In other words, in such embodiments, rotationally actuating the internal threaded fastener may adjust its position on the testing port and, thus, facilitate controlling the position of the wedged clamp segment on the coned bore insert. For example, rotating the internal threaded fastener in a first (e.g., clockwise) direction may force the internal threaded fastener toward the coned bore insert. In other words, since the wedged clamp segment is coupled between the internal threaded fastener and the coned bore insert, rotating the internal threaded fastener in the first direction may push more of the wedged clamp segment onto the coned bore insert, thereby expanding the resulting clamp segment outer surface diameter outwardly and, thus, transitioning the internal clamp assembly toward its activated state.

On other hand, rotating the internal threaded fastener a second (e.g., counter-clockwise and/or opposite) direction may force the internal threaded fastener away from the coned bore insert. In other words, since the wedged clamp segment is coupled between the internal threaded fastener and the coned bore insert, rotating the internal threaded fastener in the second direction may enable more of the wedged clamp segment to move off of the coned bore insert, thereby facilitating transition of the internal clamp assembly away from its activated state at least in part by enabling the resulting clamp segment outer surface diameter to contract inwardly, for example, due to material spring-back of one or more test head seals and/or material spring-back of a garter belt coupled around the wedged clamp segment. Moreover, when multiple wedged clamp segments are utilized, in some embodiments, an internal clamp assembly may include a clamp activation plate implemented to be coupled between the wedged clamp segments and the internal threaded fastener, for example, to facilitate uniformly controlling position of the wedged clamp segments on a corresponding coned bore insert.

Furthermore, to facilitate sealing pipe segment tubing in its annulus cavity, a reusable test head may include one or more test head seals. For example, to facilitate isolating conditions within a pipe bore of a pipe segment from conditions within the annulus cavity, the test head seals may include one or more bore seals. In fact, in some embodiments, sealing provided by a reusable test head may be controlled at least in part by the activation state of its internal clamp assembly. For example, the reusable test head may include an outer (e.g., first) bore seal implemented between a wedged clamp segment and a coned bore insert and, thus, transitioning its internal clamp assembly toward its activated position may compress the outer bore seal against the inner surface of pipe segment tubing to facilitate blocking fluid flow past the outer bore seal. Additionally, the reusable test head may include an inner (e.g., second) bore seal implemented between the coned bore insert and a closed (e.g., blind flanged) end of its testing port and, thus, transitioning its internal clamp assembly toward its activated position may compress the inner bore seal to facilitate blocking fluid flow past the inner bore seal.

Moreover, to facilitate isolating conditions external to a pipeline system from conditions within the annulus cavity of a reusable test head, the test head seals of the reusable test head may include one or more external seals. For example, the reusable test head may include an outer (e.g., first) external seal implemented along an inner surface of its end cap. Additionally, the reusable test head may include an inner (e.g., second) external seal, which is implemented to be coupled between its testing port and the end cap. In other words, in some embodiments, one or more external seals may be activated at least in part by securing (e.g., coupling) the end cap of the reusable test head shell to the testing port.

To facilitate selectively securing an end cap to a testing port, in some embodiments, the end cap of a reusable test head may be implemented to be coupled between a port ledge on the testing port and an external (e.g., second) threaded fastener, such as a nut. In particular, in such embodiments, the external threaded fastener may include fastener threading that is implemented to matingly interface with port threading on the testing port. In other words, in some such embodiments, the testing port may include first port threading, which is implemented to matingly interface with fastener threading on an internal (e.g., first) threaded fastener, and second port threading, which is implemented to matingly interface with fastener threading on the external threaded fastener. In fact, in some such embodiments, the first port threading may be implemented with a larger outer surface diameter while the second port threading is implemented with a smaller outer surface diameter, thereby producing a port ledge therebetween.

In any case, in such embodiments, rotationally actuating the external threaded fastener may facilitate adjusting the position of the end cap relative to the testing port. For example, rotating the external threaded fastener in a first (e.g., clockwise) direction may force the external threaded fastener toward the testing port ledge. In other words, rotating the external threaded fastener in the first direction may compress the outer external seal against pipe segment tubing and/or the inner external seal between the port ledge on the testing port and an inner surface of the end cap. On other hand, rotating the external threaded fastener in a second (e.g., counter-clockwise and/or opposite) direction may force the external threaded fastener away from the port ledge on the testing port. In other words, rotating the external threaded fastener in the second direction may enable the outer external seal to disengage from the pipe segment tubing and/or the inner bore seal to decompress, for example, due at least in part to material spring-back of one or more test head seals.

In this manner, as will be described in more detail below, the techniques described in the present disclosure may facilitate implementing and/or operating a (e.g., reusable) test head such that the test head is reusable to test integrity of multiple different pipe segments. Merely as an illustrative non-limiting example, implementing and/or operating a reusable test head in accordance with the techniques described in the present disclosure may enable the reusable test head to be secured to a first pipe segment to test integrity of its tubing, removed from the first pipe segment after completing a testing cycle for the first pipe segment, secured to a second (e.g., different) pipe segment to test integrity of its tubing, and so on. Thus, at least in some instances, implementing and/or operating a reusable test head in accordance with the techniques described in the present disclosure may facilitate improving testing efficiency of a pipeline system, for example, by obviating the use of a new (e.g., different) test head for testing each pipe segment deployed or to be deployed in the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at a bore fluid source 12, for example, when fluid flow through the bore of the pipeline system 10 is produced by gravity. Additionally or alternatively, in other embodiments, one or more bore fluid pumps 16 may be implemented in a pipeline system 10 and/or at a bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey or transfer (e.g., transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in the pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving flexibility, in some embodiments, the tubing of a pipe segment 20 that defines (e.g., encloses) its bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe segment bore. In other words, in such embodiments, fluid may flow through a pipe segment 20 via its bore, a fluid conduit implemented within its tubing annulus, or both.

Figure 2:
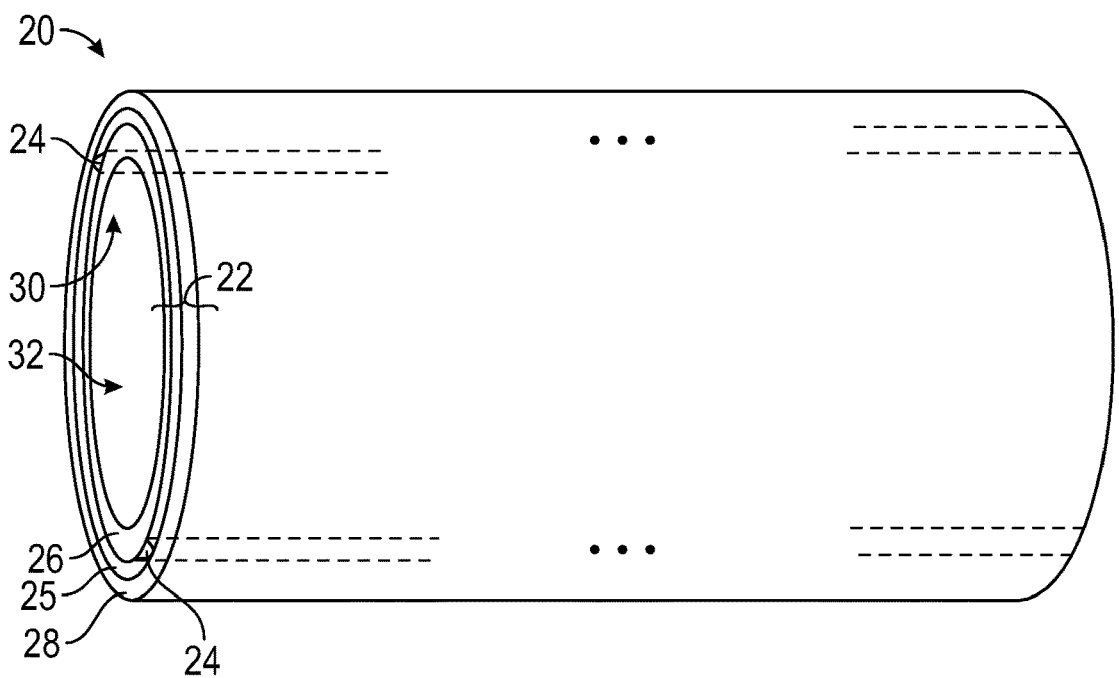
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner layer 26 defines (e.g., encloses) a pipe bore 32 through which fluid can flow, for example, to facilitate transporting the fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to a solid pipe segment tubing 22 and/or pipe segment tubing 22 that does not include fluid conduits 24 implemented therein. Moreover, to facilitate further improving flexibility, in some embodiments, one or more layers in the tubing 22 of a pipe segment 20 may be unbonded from one or more other layers in the tubing 22 and, thus, the pipe segment 20 may be an unbonded pipe segment 20.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
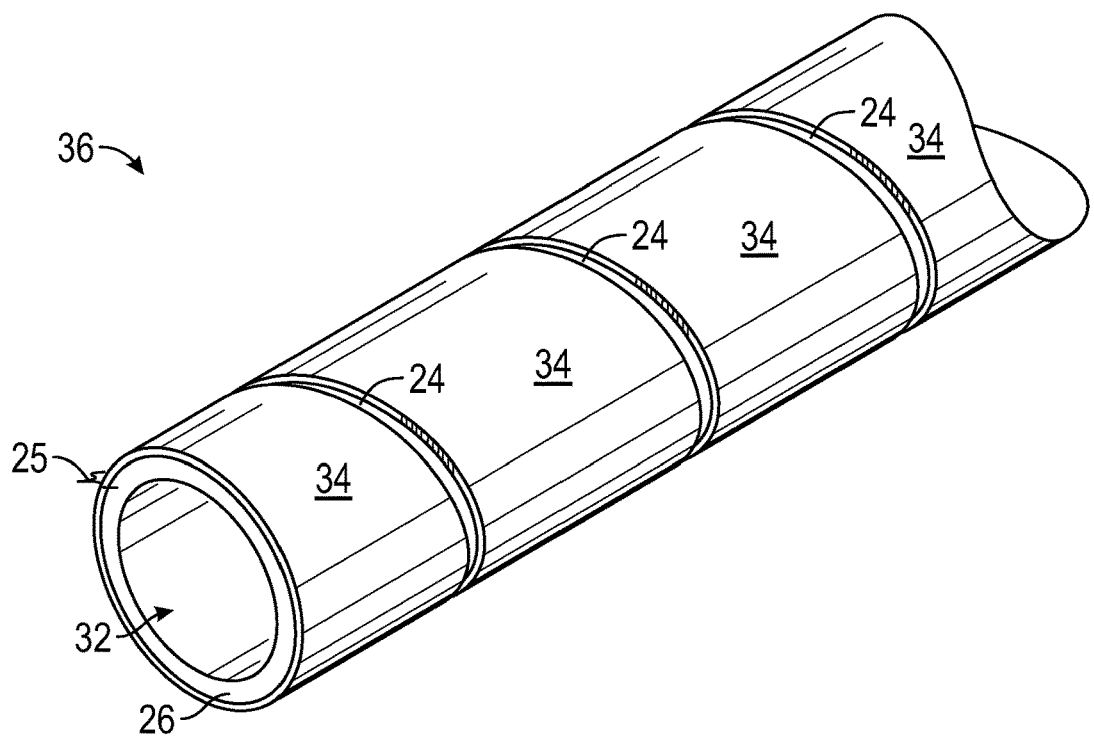
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may facilitate testing integrity of the pipe segment tubing 22, for example, by enabling communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, as described above, the tubing 22 of a pipe segment 20 may generally be implemented to facilitate isolating conditions within its pipe bore 32 from environmental conditions external to the pipe segment 20. However, even when implemented with multiple layers, in some instances, a defect, such as a breach, a kink, and/or a dent, on pipe segment tubing 22 may compromise its integrity and, thus, its ability to provide isolation, for example, due to the defect resulting in excessive (e.g., undesired) fluid flow from the pipe segment directly out into environmental conditions external to the pipe segment 20 and/or from the external environmental conditions directly into the pipe segment 20. As such, at least in some instances, operating a pipeline system 10 while pipe segment tubing 22 deployed therein has an integrity compromising defect may affect (e.g., reduce) operational efficiency and/or operational reliability of the pipeline system, for example, due to the defect resulting in conveyed fluid being lost and/or contaminated by external environmental conditions. As such, to facilitate improving operational efficiency and/or operational reliability of a pipeline system 10, in some embodiments, the integrity of a pipe segment 20 deployed in or to be deployed in the pipeline system 10 may be tested by a testing system, for example, which is implemented and/or operated to perform a testing process before beginning and/or resuming normal operation of the pipeline system 10.

Figure 4:
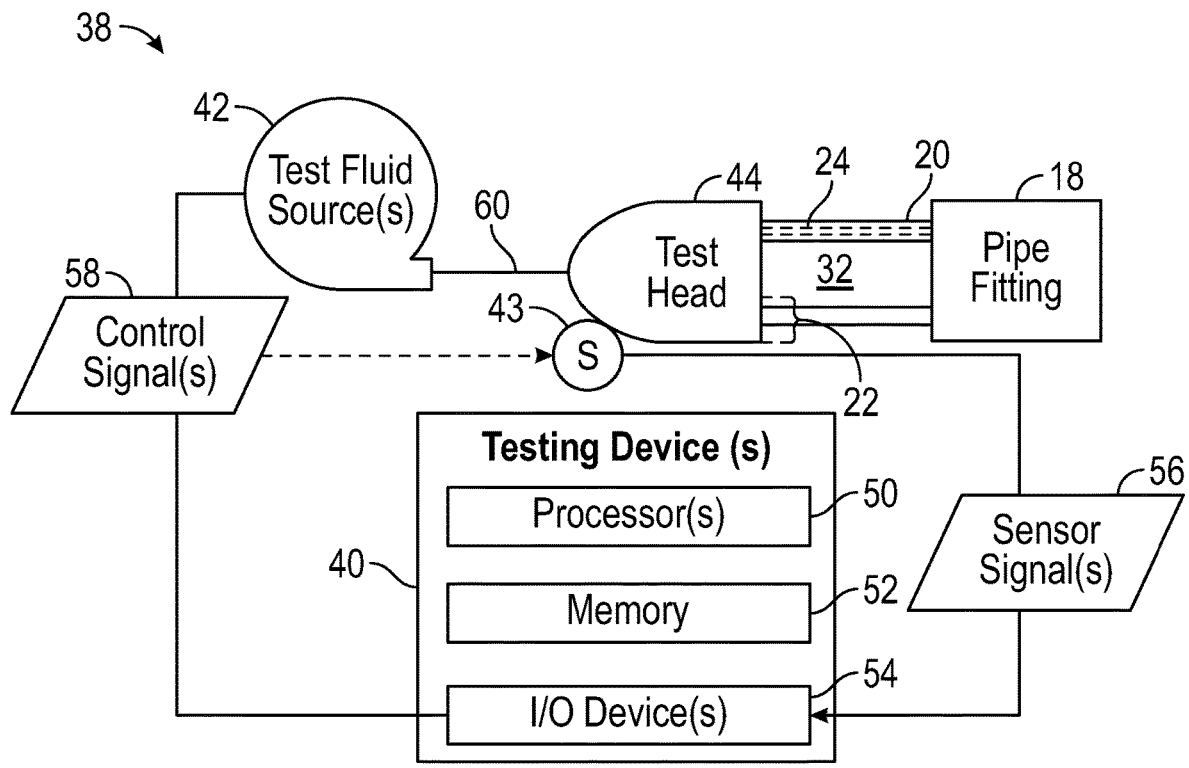
FIG. 4 is a block diagram of an example of a testing system implemented and/or operated to test integrity of one or more pipe segments deployed in or to be deployed in the pipeline system of FIG. 1, in accordance with an embodiment of the present disclosure.

To help illustrate, an example of a testing system 38, which may be used to test integrity of a pipe segments 20, is shown in FIG. 4. As in the depicted example, a testing system 38 may include one or more testing devices 40, one or more test fluid sources 42, one or more sensors 43, and at least one test head 44. In particular, as depicted, the test head 44 is coupled to an (e.g., first) end of the pipe segment 20 being tested.

However, it should be appreciated that the depicted example is merely intended to be illustrative and not limiting. In particular, although a single pipe segment 20 is depicted, in other embodiments, multiple pipe segments 20 may be concurrently tested, for example, by fluidly coupling the pipe segments 20 between the test head 44 and the depicted pipe fitting 18 via one or more midline pipe fittings 18. Additionally or alternatively, although a pipe fitting 18 is depicted as being coupled to another (e.g., second and/or opposite) end of the pipe segment 20 being tested, in other embodiments, another test head 44 may be used instead. In other words, in such embodiments, a first test head 44 may be coupled to a first end of a pipe segment 20 while a second test head 44 is coupled to a second (e.g., opposite) end of the pipe segment 20.

Additionally, in some embodiments, a test fluid source 42 in the testing system 38 may include a test fluid pump and/or a compressed air tank, which is implemented and/or operated to selectively supply (e.g., inject and/or pump) test fluid to the test head 44 via one or more test fluid conduits 60, for example, based at least in part on a control signal 58 received from a testing device 40 and/or valve position of one or more valves fluidly coupled between the test fluid source 42 and the test head 44. Although testing examples that utilize test fluid injection are described, in other embodiments, the techniques described in the present disclosure may additionally or alternatively be utilized in testing processes and/or testing systems 38 that are based on test fluid extraction. In other words, in such embodiments, the test fluid source 42 in the testing system 38 may include a test fluid pump, which is implemented and/or operated to selectively extract (e.g., vacuum and/or pump) test fluid out from the test head 44 via one or more test fluid conduits 60, for example, based at least in part on a control signal 58 received from a testing device 40 and/or valve position of one or more valves fluidly coupled between the test fluid source 42 and the test head 44.

Thus, at least in some embodiments, the one or more testing (e.g., electronic and/or computing) devices 40 may generally control operation of the testing system 38. To facilitate controlling operation, as in the depicted example, a testing device 40 may include one or more processors 50, memory 52, and one or more input/output (I/O) devices 54. In some embodiments, the memory 52 in a testing device 40 may include a tangible, non-transitory, computer-readable medium that is implemented and/or operated to store data and/or executable instructions. For example, the memory 52 may store sensor data based at least in part on one or more sensor signals 56 received from a sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in a testing device 40 may include processing circuitry implemented and/or operated to process data and/or execute instructions stored in memory 52. In other words, in some such embodiments, a processor 50 in a testing device 40 may include one or more general purpose microprocessors, one or more application specific integrated circuits (ASICs), one or more field programmable gate arrays (FPGAs), or any combination thereof. For example, a processor 50 in a testing device 40 may process sensor data stored in memory 52 to determine an integrity state of pipe segment tubing 22 being tested.

Additionally or alternatively, a processor 50 in a testing device 40 may execute instructions stored in memory 52 to determine one or more control (e.g., command) signals 58 that instruct the testing system 38 to perform corresponding control actions. For example, the testing device 40 may determine a control signal 58 that instructs a test fluid source 42 to supply (e.g., inject and/or pump) test fluid to the test head 44. As another example, the testing device 40 may determine a control signal 58 that instructs a sensor 43 to return one or more sensor signals 56 indicative of corresponding fluid parameters, such as fluid temperature, fluid pressure, and/or fluid composition, determined (e.g., sensed and/or measured) by the sensor 43.

To enable external communication, in some embodiments, the I/O devices 54 of a testing device 40 may include one or more input/output (I/O) ports (e.g., terminals). Additionally, to facilitate communicating the results of an integrity test to a user (e.g., operator), in some embodiments, the I/O devices 54 of a testing device 40 may include one or more user output devices, such as an electronic display, which is implemented and/or operated to display a graphical user interface (GUI) that provides a visual representation of integrity test results (e.g., integrity state of tested pipe segment 20). Furthermore, to enable user interaction with the testing system 38, in some embodiments, the I/O devices 54 of a testing device 40 may include one or more user input devices, such as a hard button, a soft button, a keyboard, a mouse, and/or the like. For example, the one or more user input devices may enable an operator to input a user command that instructs the testing system 38 to initiate an integrity test for a pipe segment 20.

In any case, as described above, the tubing 22 of a pipe segment 20 is generally implemented to facilitate isolating (e.g., insulating) conditions internal to the pipe segment 20 from environmental conditions external to the pipe segment 20. For example, an outer layer 28 of the pipe segment tubing 22 may be implemented to facilitate isolating the external environmental conditions from conditions in the pipe bore 32 of the pipe segment 20 and, thus, from conditions in a fluid conduit 24 that is implemented in the tubing annulus 25, which is internal to the outer layer 28 of the pipe segment tubing 22. Additionally or alternatively, an inner layer 26 of the pipe segment tubing 22 may be implemented to facilitate isolating the conditions in the pipe bore 32 of the pipe segment 20 from the external environmental condition and, thus, from the conditions in a fluid conduit 24 that is implemented in the tubing annulus 25, which is external to the inner layer 26 of the pipe segment tubing 22.

Nevertheless, in some instances, a defect, such as a dent, a kink, and/or a breach, on the tubing 22 of a pipe segment 20 may affect (e.g., compromise and/or reduce) its integrity and, thus, its ability to provide isolation. For example, a defect in the outer layer 28 of the pipe segment tubing 22 may reduce its ability to provide isolation between environmental conditions external to the pipe segment 20 and the conditions in a fluid conduit 24 that is implemented in the tubing annulus 25, which is internal to the outer layer 28 of the pipe segment tubing 22. Additionally or alternatively, a defect in an inner layer 26 of the pipe segment tubing 22 may reduce its ability to provide isolation between the conditions in the pipe bore 32 of the pipe segment 20 and the conditions in a fluid conduit 24 that is implemented in the tubing annulus 25, which is external to the inner layer 26 of the pipe segment tubing 22.

Generally, when a defect is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with non-faulty (e.g., non-defective) tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. In other words, at least in some instances, an unexpected (e.g., unpredicted) change in a fluid parameter resulting from fluid flow through a pipe segment 20 may be indicative of corresponding pipe segment tubing 22 potentially having one or more defects, such as a dent, a kink, and/or a breach.

Leveraging this fact, to facilitate testing pipe segment integrity, in some embodiments, the testing system 38 may inject a test fluid into one or more fluid conduits 24 implemented in the tubing annulus 25 (e.g., one or more intermediate layers 34) of the pipe segment tubing 22, for example, via a test fluid source 42 fluidly coupled to the test head 44. In particular, in some embodiments, the test fluid may be an inert fluid, such as nitrogen (e.g., $N_2$) gas. Additionally, in some embodiments, one or more fluid parameters (e.g., temperature, pressure, and/or composition) of the test fluid may be pre-determined before supply to a fluid conduit 24 implemented in an intermediate layer of the pipe segment tubing 22, for example, offline by a test lab and/or a fluid supplier such that the pre-determined fluid parameters of the test fluid are stored in memory 52 of a testing device 40. In some embodiments, one or more fluid parameters of the test fluid may be additionally or alternatively determined (e.g., sensed and/or measured) while the test fluid is being supplied to the tubing annulus 25 of the pipe segment tubing 22, for example, online and/or in real-time via one or more sensors 43 such that the input (e.g., initial) fluid parameters of the test fluid are stored in memory 52 of a testing device 40.

As described above, at least in some instances, a defect in the tubing 22 of a pipe segment 20 may result in one or more parameters of fluid flowing through the pipe segment 20 changing in a manner different than expected (e.g., predicted). To facilitate determining changes in fluid parameters resulting from fluid flow in the annulus 25 of pipe segment tubing 22, in some embodiments, the testing system 38 may determine one or more downstream fluid parameters (e.g., temperature, pressure, and/or composition) via one or more sensors 43, for example, which are internal to the test head 44 and/or fluidly coupled to the test head 44. In other words, in such embodiments, the testing system 38 may test the integrity of pipe segment tubing 22 at least in part by comparing one or more fluid parameters of fluid (e.g., test fluid) supplied to the tubbing annulus 25 and corresponding downstream fluid parameters resulting from fluid flow through the tubbing annulus 25. Thus, at least in some instances, implementing and/or operating a testing system 38 in this manner may facilitate improving operational reliability of a pipeline system 10, for example, by enabling confirmation of pipe segment integrity and/or amelioration of a pipe segment defect before beginning and/or resuming normal operation of the pipeline system 10.

Figure 5:
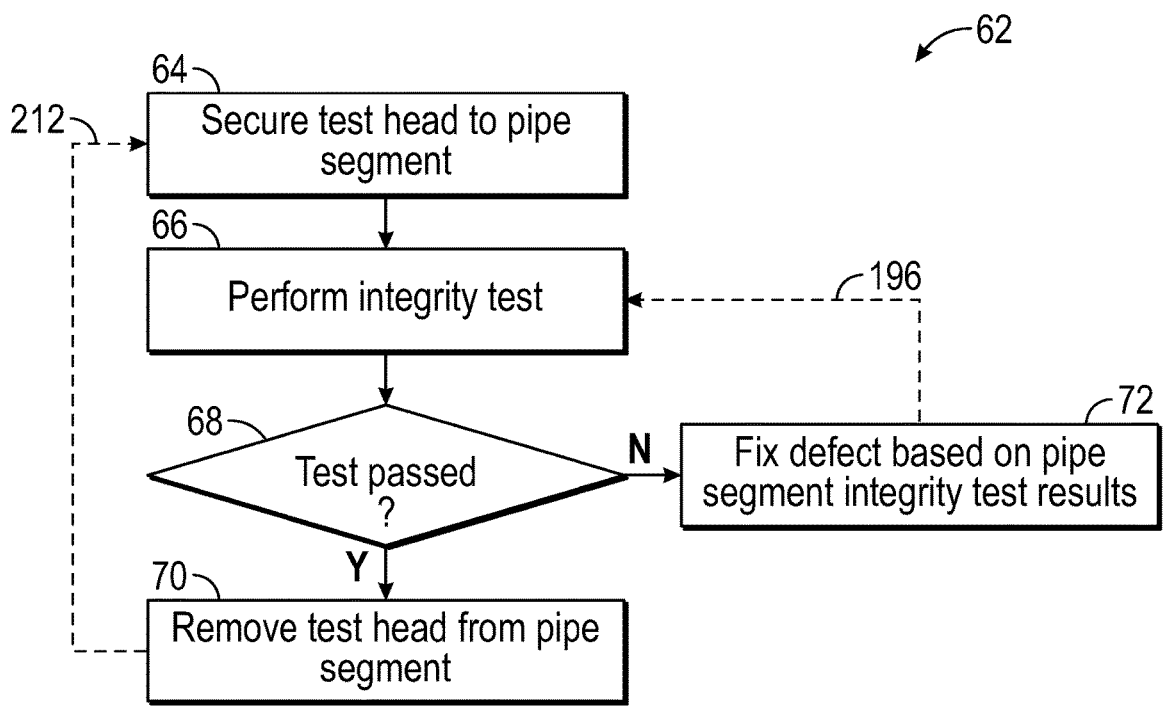
FIG. 5 is a flow diagram of an example of a process for operating the testing system of FIG. 4, in accordance with an embodiment of the present disclosure.

To help further illustrate, an example of a process 62 for operating a testing system 38 is described in FIG. 5. Generally, the process 62 includes securing a test head to a pipe segment (process block 64), performing an integrity test (process block 66), and determining whether the integrity test has been passed (decision block 68). Additionally, the process 62 generally includes removing the test head from the pipe segment when the integrity test has been passed (process block 70) and fixing a defect based on results of the integrity test when the integrity test has not been passed (process block 72).

Although described in a specific order, which corresponds with an embodiment of the present disclosure, it should be appreciated that the example process 62 is merely intended to be illustrative and non-limiting. In particular, in other embodiments, a process 62 for operating a testing system 38 may include one or more additional process blocks and/or omit one or more of the depicted process blocks. Moreover, in some embodiments, the process 62 may be performed at least in part by executing instructions stored in a tangible, non-transitory, computer-readable medium, such as memory 52 in a testing device 40, using processing circuitry, such as a processor 50 in the testing device 40.

For example, in some such embodiments, a testing device 40 in a testing system 38 may instruct deployment equipment, such as swage machine, to secure a test head 44 to a pipe segment 20 (process block 64). Additionally or alternatively, an operator (e.g., user or technician) may manually secure the test head 44 to the pipe segment 20. In any case, as described above, in some instances, a test head 44 may be secured to the tubing 22 of a pipe segment 20 using swaging techniques. For example, in some such instances, an open end of the pipe segment tubing 22 may be inserted into the shell of the test head 44 and a swage machine (e.g., deployment equipment) may then compress the test head shell such that resulting deformation on an inner surface of the test head shell conforms with resulting deformation on an outer surface of the pipe segment tubing 22, thereby securing and sealing the open end of the pipe segment tubing 22 and, thus, its tubing annulus 25 in the test head 44.

However, at least in some instances, securing a test head 44 to a pipe segment 20 using swaging techniques may affect (e.g., reduce and/or limit) testing efficiency of a pipeline system 10. For example, at least in some instances, the conformal deformation of a test head shell and pipe segment tubing 22 produced by the swage machine may result in the test head 44 effectively being permanently coupled to the pipe segment 20. Thus, at least in some such instances, the test head 44 and the portion of the pipe segment 20 secured in the test head 44 may be cut off before the pipe segment 20 is deployed in and/or used in normal operation of a pipeline system 10. Moreover, even when the portion of a pipe segment 20 secured to a test head 44 is removable from the test head 44, at least in some instances, deformation of the test head shell may limit the ability of the test head 44 to be reused for testing another pipe segment 20.

In other words, at least in some instances, a test head 44 secured using swaging techniques may effectively be a one-time-use (e.g., sacrificial) test head 44. Thus, at least in such instances, utilizing a test head 44 secured via a swaged fastener mechanism may potentially limit testing efficiency of a pipeline system 10, for example, due to at least one new (e.g., different) test head 44 being used to test each pipe segment 20 deployed in or to be deployed in the pipeline system 10. To facilitate improving testing efficiency, a testing system 38 may instead include a test head 44 that is reusable to test multiple different pipe segments 20. In particular, to facilitate providing reusability, a test head 44 may include one or more reusable fastener mechanism, for example, instead of a swaged (e.g., one-time-use) fastener mechanism.

Figure 6:
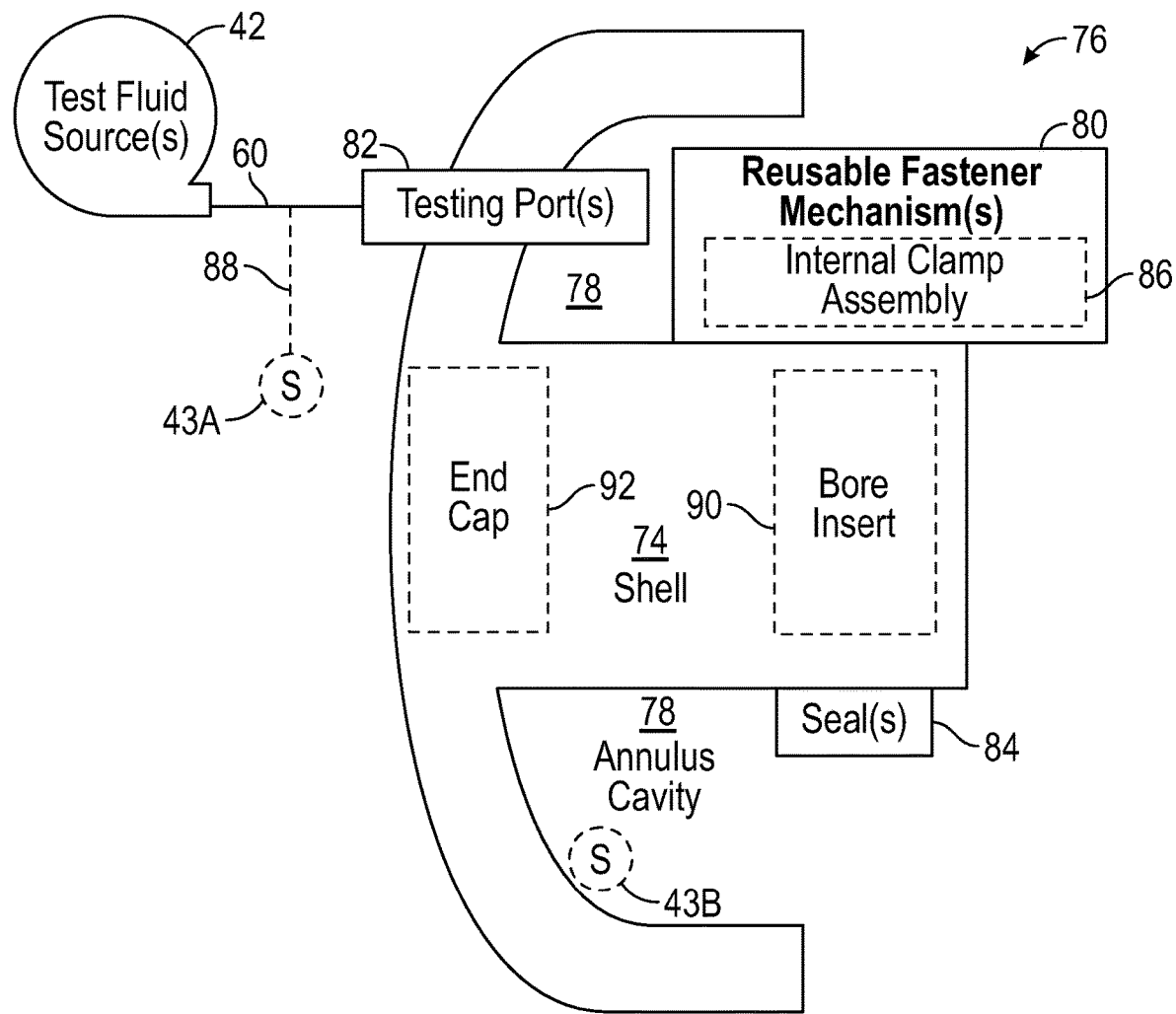
FIG. 6 is a block diagram of an example of a portion of the testing system of FIG. 4, which includes a reusable test head, in accordance with an embodiment of the present disclosure.

To help illustrate, an example of a test head 44 that is reusable—namely a reusable test head 76—is shown in FIG. 6. As depicted, the reusable test head 76 includes a shell (e.g., body) 74 implemented to define (e.g., enclose) an annulus cavity 78, one or more reusable fastener mechanisms 80 coupled to the reusable test head shell 74, and one or more test head seals 84. As will be described in more detail below, the annulus cavity 78 of the reusable test head 76 may generally be implemented to interface with pipe segment tubing 22 and the one or more seals 84 may be implemented to facilitate sealing an open end of its tubing annulus 25 in the annulus cavity 78.

As described above, in some embodiments, integrity of pipe segment tubing 22 may be tested at least in part by injecting test fluid, such as nitrogen (e.g., N2) gas, into a fluid conduit 24 implemented in its annulus 25 and determining one or more downstream fluid parameters that result from fluid flow through the tubing annulus 25. In other words, to facilitate testing integrity of pipe segment tubing 22, fluid may flow into and/or out from a fluid conduit 24 implemented in the annulus 25 of the pipe segment tubing 22. Since used to seal an open end of the pipe segment tubing 22, to enable fluid flow therethrough, as in the depicted example, the test head 44 may include one or more testing ports 82.

In particular, as will be described in more detail below, a testing port 82 may include an opening in the reusable test head shell 74 that enables fluid flow into and/or out from the annulus cavity 78 of reusable the test head 76. For example, a testing port 82 on the reusable test head 76 may be fluidly coupled to a test fluid source 42 via one or more test fluid conduits 60, thereby enabling a test fluid (e.g., liquid and/or gas) to be selectively injected (e.g., supplied and/or pumped) into its annulus cavity 78 and, thus, a fluid conduit 24 implemented in the tubing annulus 25 of pipe segment tubing 22 secured in its annulus cavity 78. Additionally or alternatively, a testing port 82 on the reusable test head 44 may be fluidly coupled to one or more external sensors 43A (e.g., via one or more fluid extraction conduits 88), thereby enabling fluid that flows from a fluid conduit 24, which is implemented in the tubing annulus 25 of pipe segment tubing 22, into its annulus cavity 78 to be supplied to the one or more external sensors 43A.

To facilitate selectively securing pipe segment tubing 22 in its annulus cavity 78, as in the depicted example, the reusable test head 44 may include one or more reusable fastener mechanisms 80. In particular, in some embodiments, a reusable fastener mechanism 80 may include an internal clamp assembly 86. As will be described in more detail below, in some embodiments, an internal (e.g., reusable) clamp assembly 86 may be coupled to a bore insert 90 of the reusable test head shell 74, which is implemented to be inserted into the pipe bore 32 defined (e.g., enclosed) by pipe segment tubing 22. In other words, as will be described in more detail below, the internal clamp assembly 86 may be implemented to be inserted into the pipe bore 32 and, thus, operated to selectively engage an inner surface of the pipe segment tubing 22.

However, it should be appreciated that the depicted example is merely intended to be illustrative and not limiting. In particular, in other embodiments, a reusable test head 76 may additionally or alternatively include one or more other types of reusable fastener mechanisms 80, such as an electromagnetic fastener mechanism. Furthermore, in other embodiments, one or more internal sensors 43B may be additionally or alternatively implemented within the shell 74 of a reusable test head 76. In any case, as in the depicted example, in some embodiments, the reusable test head shell 74 may additionally include an end cap (e.g., wall) 92, which is implemented to externally cover an open end of pipe segment tubing 22.

Figure 7:
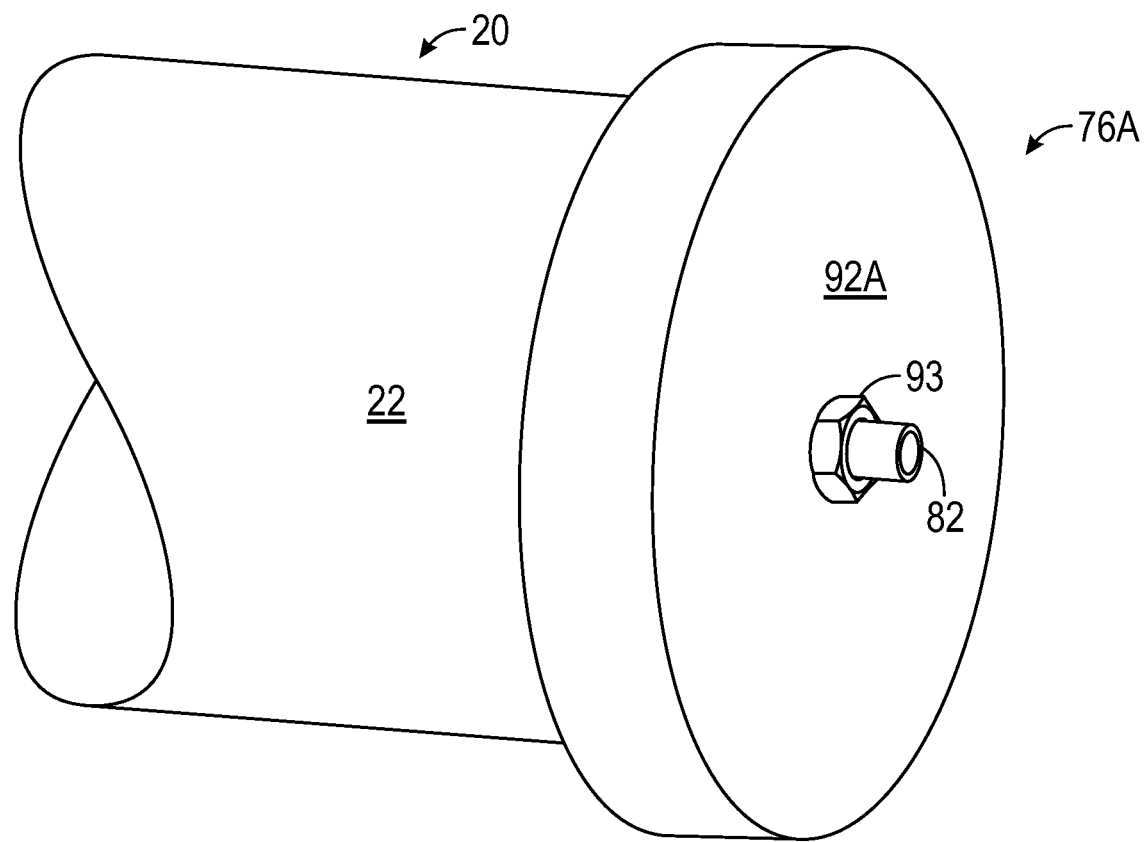
FIG. 7 is a perspective view of an example of the reusable test head of FIG. 6 coupled to a pipe segment, in accordance with an embodiment of the present disclosure.

To help illustrate, an example of a reusable test head 76A coupled (e.g., secured) to a pipe segment 20 is shown in FIG. 7. As depicted, the reusable test head 76A includes an end cap (e.g., wall) 92A. As will be described in more detail below, when the reusable test head 76A is coupled to the pipe segment 20, the end cap 92A may externally cover an open end of the tubing 22 of the pipe segment 20.

Additionally, as depicted, the reusable test head 76A includes a testing port 82, which opens through the end cap 92A, and an external threaded fastener 93, which is coupled around the testing port 82. As described above, in some embodiments, the testing port 82 may be fluidly coupled to one or more test fluid sources 42, for example, via one or more test fluid conduits 60. Additionally or alternatively, as described above, the testing port 82 may be fluidly coupled to one or more external sensors 43A, for example, via one or more fluid extraction conduits 88.

However, it should be appreciated that the depicted example is merely intended to be illustrative and not limiting. In particular, in other embodiments, the end cap 92 of a reusable test head shell 74 may be implemented with a different shape. Additionally or alternatively, in other embodiments, a reusable test head 76 may include fewer (e.g., zero) testing ports 82 or more than one (e.g., two, three, or more) testing ports 82.

In any case, as described above, in some embodiments, a reusable test head shell 74 may include a bore insert 90 in addition to its end cap 92. Additionally, as described above, a reusable test head 76 may include one or more internal (e.g., reusable) clamp assemblies 86 coupled to its bore insert 90. As will be described in more detail below, in some embodiments, an internal clamp assembly 86 may be implemented and/or operated to facilitate selectively securing the reusable test head 76 to pipe segment tubing 22. For example, the reusable test head 76 may be secured to the pipe segment tubing 22 while the internal clamp assembly 86 is in its activated state and unsecured from the pipe segment tubing 22 while the internal clamp assembly 86 is in a deactivated state.

Figure 8:
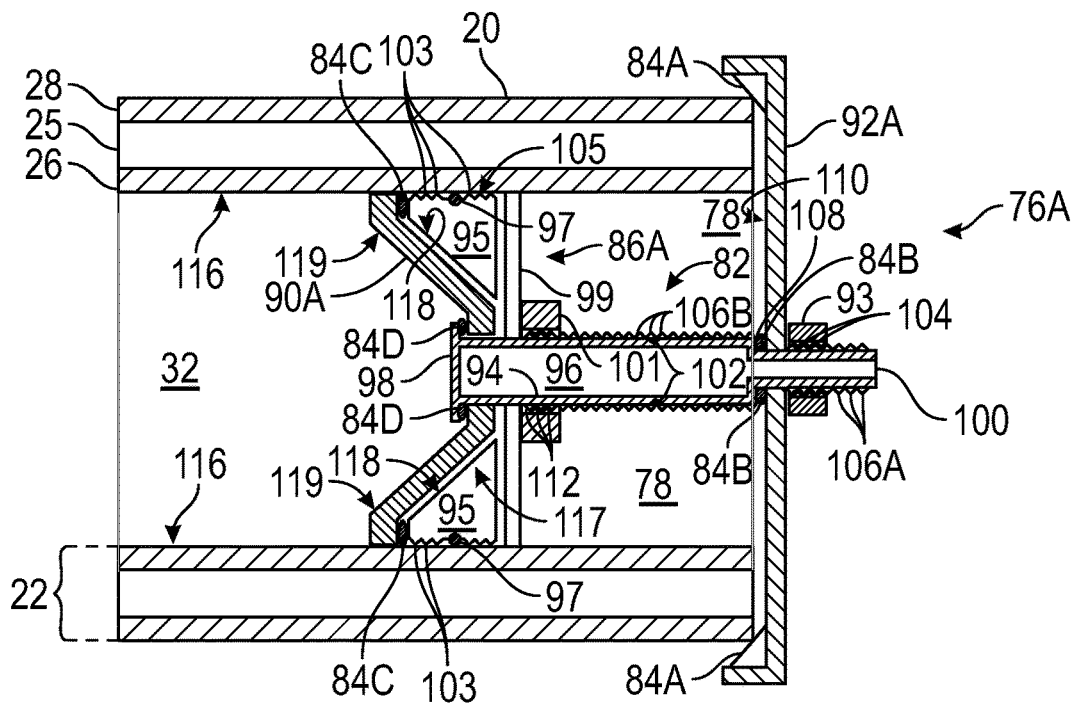
FIG. 8 is a side cross-sectional view of an example of the reusable test head, which is in an activated state, and pipe segment of FIG. 7, in accordance with an embodiment of the present disclosure.
Figure 9:
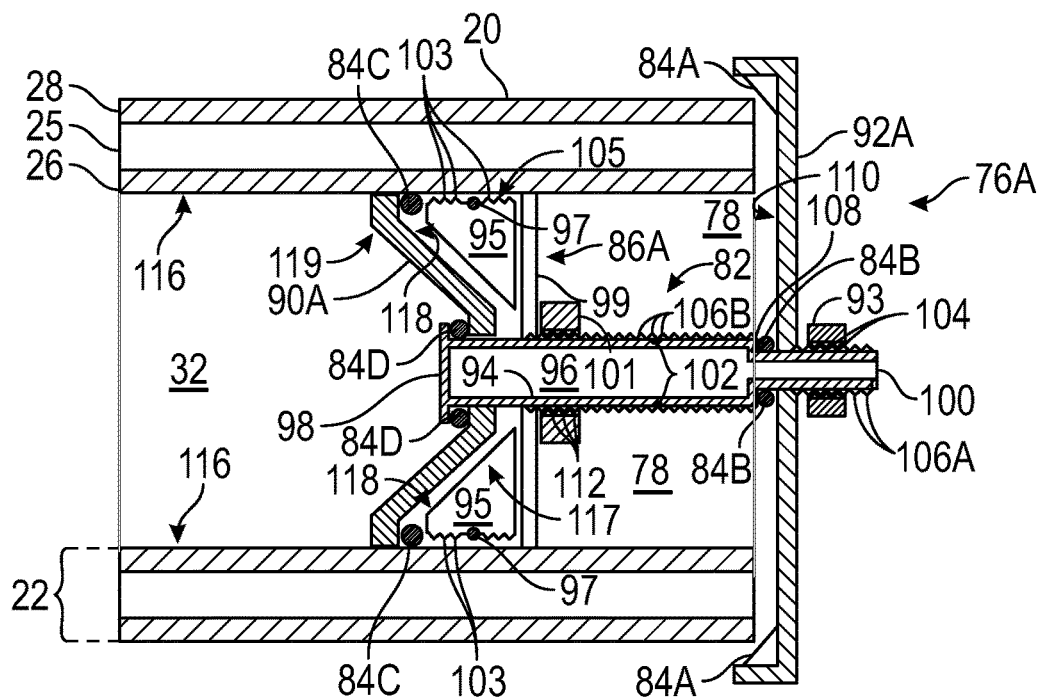
FIG. 9 is a side cross-sectional view of an example of the reusable test head, which is in a deactivated state, and pipe segment of FIG. 7, in accordance with an embodiment of the present disclosure.

To help illustrate, example cross-sections of a reusable test head 76A, which includes an internal clamp assembly 86A, and a pipe segment 20 are shown in FIGS. 8 and 9. As depicted in FIGS. 8 and 9, the internal clamp assembly 86A includes multiple clamp segments 95, a garter belt 97 coupled circumferentially around the clamp segments 95, a clamp activation plate 99, and an internal threaded fastener 101. In particular, as depicted, each of the clamp segments 95 has teeth (e.g., serrations) 103 implemented on its outer surface 105. Additionally, as depicted, the clamp segments 95 have a female taper and, thus, a wedge-shaped axial cross-section profile. In other words, the clamp segments 95 depicted in FIGS. 8 and 9 may each be a wedged clamp segment 95 with a diagonal (e.g., inner) surface 117.

Furthermore, as depicted in FIGS. 8 and 9, the tubing 22 of the pipe segment 20 defines a pipe bore 32 and includes an inner layer 26, an outer layer 28, and a tubing annulus 25, for example, which may be implemented using one or more intermediate layers 34. Moreover, as depicted, the shell 74 of the reusable test head 76A includes an end cap 92A as well as a bore insert 90A, which define an annulus cavity 78 to be used to interface with the tubing 22 and, thus, the tubing annulus 25 of the pipe segment 20. In particular, as depicted, the bore insert 90A has a male taper and, thus, a cone-shaped axial cross-section profile. In other words, the shell bore insert 90A depicted in FIGS. 8 and 9 may be a coned bore insert 90A.

However, it should be appreciated that the depicted examples are merely intended to be illustrative and not limiting. In particular, in other embodiments, the bore insert 90 of a reusable test head 76 may instead be implemented with a wedge-shaped axial cross-section profile and, thus, may be a wedged bore insert 90. Additionally or alternatively, in other embodiments, the internal clamp assembly 86 may not include a garter belt 97 and/or a clamp activation plate 99, for example, when the internal clamp assembly 86 includes a single flower-shaped clamp segment 95 instead of multiple discrete (e.g., separate) clamp segments 95. Furthermore, in other embodiments, the outer surface 105 of a clamp segment 95 may additionally or alternatively not include teeth 103, for example, such that the outer surface 105 of the clamp segment 95 is relatively (e.g., substantially) smooth. Moreover, in other embodiments, the depicted testing port 82 may be replaced with a cylindrical component, such as a bolt, for example, when the reusable test head 76 includes one or more separate testing ports 82 that open through its end cap 92.

In any case, as depicted in FIGS. 8 and 9, a testing port 82 of the reusable test head 76A extends through an opening in the coned bore insert 90A as well as an opening in the end cap 92A. In particular, as depicted, the testing port 82 includes port tubing 94, which defines (e.g., encloses) a port bore 96, that extends through the coned bore insert 90A and the end cap 92A such that a closed (e.g., blind flanged) end 98 of the testing port 82 is on a first (e.g., internal) side of the coned bore insert 90A while an open end 100 of the testing port 82 is on a second (e.g., external and/or opposite) side of the end cap 92A. Additionally, to facilitate fluid extraction from and/or fluid injection into the annulus cavity 78, as in the depicted example, the testing port 82 may include one or more port openings 102 implemented in its port tubing 94, thereby fluidly coupling the port bore 96 with the annulus cavity 78 of the reusable test head 76A.

Furthermore, as depicted in FIGS. 8 and 9, the testing port 82 is coupled to the shell 74 of the reusable test head 76A as well as to the internal clamp assembly 86A and, thus, may facilitate securing (e.g., coupling) the internal clamp assembly 86A to the shell 74 of the reusable test head 76A. In particular, the end cap 92A may be selectively secured to the testing port 82 via an external threaded fastener 93, which includes external fastener threading 104 that is implemented to matingly interface with external port threading 106A on the testing port 82. For example, the end cap 92A may be selectively secured to the testing port 82 at least in part by tightening (e.g., rotating in a first and/or clockwise direction) the external threaded fastener 93 on the external port threading 106A such that the external threaded fastener 93 is transitioned from its position depicted in FIG. 9 toward its position depicted in FIG. 8, thereby forcing the end cap 92A toward a port ledge 108 on the testing port 82. On the other hand, the end cap 92A may be selectively unsecured from the testing port 82 at least in part by loosening (e.g., rotating in a second, opposite, and/or counter-clockwise direction) the external threaded fastener 93 from the external port threading 106A such that the external threaded fastener 93 is transitioned from its position depicted in FIG. 8 toward its position depicted in FIG. 9, thereby enabling the end cap 92 to move away from the port ledge 108 on the testing port 82, for example, due at least in part to the material spring-back of one or more test head seals 84.

In fact, in some embodiments, a process for selectively securing the end cap 92A to the testing port 82 may facilitate sealing the annulus cavity 78 from environmental conditions external to the pipe segment 20. In particular, as depicted in FIGS. 8 and 9, an outer external seal 84A and an inner external seal 84B are implemented along an inner surface 110 of the end cap 92A. As such, tightening the external threaded fastener 93 may compress the outer external seal 84A against the tubing 22 of the pipe segment 20 and/or the inner external seal 84B between the port ledge 108 on the testing port 82 and the inner surface 110 of the end cap 92A, which, at least in some instances, may facilitate blocking fluid flow directly between the annulus cavity 78 and the external environmental conditions.

Additionally, the internal clamp assembly 86A may be selectively secured to the testing port 82 and, thus, the shell 74 of the reusable test head 76A via the internal threaded fastener 101, which includes internal fastener threading 112 that is implemented to matingly interface with internal port threading 106B on the testing port 82. For example, the internal clamp assembly 86A may be selectively secured to the testing port 82 at least in part by tightening (e.g., rotating in a first and/or clockwise direction) the internal threaded fastener 101 on the internal port threading 106B such that the internal threaded fastener 101 is transitioned from its position depicted in FIG. 9 toward its position depicted in FIG. 8, thereby forcing the internal clamp assembly 86A toward the coned bore insert 90A. On the other hand, the internal clamp assembly 86A may be selectively unsecured from the testing port 82 at least in part by loosening (e.g., rotating in a second, opposite, and/or counter-clockwise direction) the internal threaded fastener 101 from the internal port threading 106B, thereby enabling the internal clamp assembly 86A to move away from the coned bore insert 90A, for example, due at least in part to the material spring-back of the garter belt 97 and/or material spring-back of one or more test head seals 84.

In fact, in some embodiments, a process for selectively securing the internal clamp assembly 86A to the testing port 82 may facilitate sealing the annulus cavity 78 from conditions within the pipe bore 32 of the pipe segment 20. In particular, as depicted in FIGS. 8 and 9, an outer bore seal 84C is implemented between the wedged clamp segments 95 of the internal clamp assembly 86A and an outer surface 118 of the coned bore insert 90A. As such, tightening the internal threaded fastener 101 may compress the outer bore seal 84C between the internal clamp assembly 86A and the coned bore insert 90A such that the outer bore seal 84C is compressed against an inner surface 116 of the pipe segment tubing 22, which, at least in some instances, may facilitate blocking fluid flow directly between the annulus cavity 78 and the pipe bore 32. Additionally, as depicted in FIGS. 8 and 9, an inner bore seal 84D is implemented between the closed end 98 of the testing port 82 and an inner surface 119 of the coned bore insert 90A. As such, tightening the internal threaded fastener 101 may compress the inner bore seal 84D between the testing port 82 and the coned bore insert 90A, which, at least in some instances, may facilitate blocking fluid flow directly between the annulus cavity 78 and the pipe bore 32.

However, it should again be appreciated that the depicted example is merely intended to be illustrative and not limiting. In particular, in other embodiments, an inner external seal 84B may be obviated and, thus, not included in a reusable test head 76, for example, when threading sealant is implemented at the junction between an end cap 92 and a corresponding testing port 82 of the reusable test head 76. Additionally or alternatively, an inner bore seal 84D may be obviated and, thus, not included in a reusable test head 76, for example, when threading sealant is implemented at the junction between a bore insert 90 and a corresponding testing port 82 of the reusable test head 76. Moreover, to facilitate rotating a threaded fastener (e.g., internal threaded fastener 101 or outer threaded fastener 93) relative to a testing port 82 of a reusable test head 76, in some embodiments, the testing port 82 may be keyed to enable the testing port 82 to be held in place while the threaded fastener is being rotated thereon, for example, with one or more flat outer surfaces, which are implemented to enable a wrench to grab onto the testing port 82, and/or with one or more flat inner surfaces, which are implemented at the open end 100 of the testing port 82 to enable a keyed shaft to matingly interlock with the testing port 82.

In any case, as depicted in FIG. 8, the outer surface 105 of the wedged clamp segments 95 is engaged with the inner surface 116 of the pipe segment tubing 22. As such, force exerted on the pipe segment tubing 22 may be transferred to the reusable test head 76A via the internal clamp assembly 86A, which, at least in some instances, may facilitate offsetting the exerted force and, thus, securing the pipe segment tubing 22 to the reusable test head 76A. To enable engagement with the pipe segment tubing 22, the outer surface diameter of the wedged clamp segments 95 depicted in FIG. 8 may be greater than or equal to a default (e.g., natural, original, and/or uncompressed) inner surface diameter of the pipe segment tubing 22. As described above, in some embodiments, an internal clamp assembly 86 may be in its activated state when an outer surface diameter of its one or more wedged clamp segments 95 is greater than or equal to the default inner surface diameter of pipe segment tubing 22 secured or to be secured thereto. In other words, in such embodiments, the internal clamp assembly 86A of the reusable test head 76A in FIG. 8 may be in its activated state.

On the other hand, as depicted in FIG. 9, the outer surface 105 of the wedged clamp segments 95 is disengaged from the inner surface 116 of the pipe segment tubing 22. In other words, the outer surface diameter of the wedged clamp segments 95 depicted in FIG. 9 may be less than the default inner surface diameter of the pipe segment tubing 22. As described above, in some embodiments, an internal clamp assembly 86 may be in a deactivated state when an outer surface diameter of its one or more wedged clamp segments 95 is less than the default inner surface diameter of pipe segment tubing 22 secured or to be secured thereto. In other words, in such embodiments, the internal clamp assembly 86A of the reusable test head 76A in FIG. 9 may be in a deactivated state. Accordingly, as will be described in more detail below, an internal clamp assembly 86 may exert less resistance to movement of pipe segment tubing 22 while in a deactivated state and, thus, the pipe segment tubing 22 may be inserted into and/or withdrawn from a corresponding reusable test head 76 while the internal clamp assembly 86 is in a deactivated state.

In fact, due to the taper slopes, moving the position of the wedged clamp segments 95 on the coned bore insert 90A may control the outer surface diameter of the wedged clamp segments 95 and, thus, the activation state of the internal clamp assembly 86A, for example, due to different positions resulting in different thickness of the wedged clamp segments 95 being present between the outer surface 118 of the coned bore insert 90A and the inner surface 116 of the pipe segment tubing 22. Merely as an illustrative non-limiting example, moving the wedged clamp segments 95 from the position depicted in FIG. 8 toward the position depicted in FIG. 9 may result in the diagonal surface 117 of the wedged clamp segments 95 covering less of the coned bore insert 90A and, thus, a thicker portion of the wedged clamp segments 95 being moved out from between the outer surface 118 of the coned bore insert 90A and the inner surface 116 of the pipe segment tubing 22, thereby enabling the wedged clamp segments 95 to contract inwardly, for example, due at least in part to material spring-back of the garter belt 97 implemented circumferentially along the outer surface 105 of the wedge clamp segments 95 and/or material spring-back of one or more test head seals 84. On the other hand, moving the wedged clamp segments 95 from the position depicted in FIG. 9 toward the position depicted in FIG. 8 may result in the diagonal surface 117 of the wedged clamp segments covering more of the coned bore insert 90A and, thus, a thicker portion of the wedged clamp segments 95 being moved in between the outer surface 118 of the coned bore insert 90A and the inner surface 116 of the pipe segment tubing 22, thereby causing the wedged clamp segments 95 to expand outwardly, for example, due at least in part to the non-zero slope of the coned bore insert 90A. Thus, as will be described in more detail below, implementing a reusable test head 76 in this manner may enable the reusable test head 76 to be selectively secured to and, thus, used to test integrity of a pipe segment 20, which, at least in some instances, may facilitate improving testing efficiency for a pipeline system 10, for example, by enabling the same reusable test head 76 to be used to test integrity of multiple different pipe segments deployed or to be deployed in the pipeline system 10.

Figure 10:
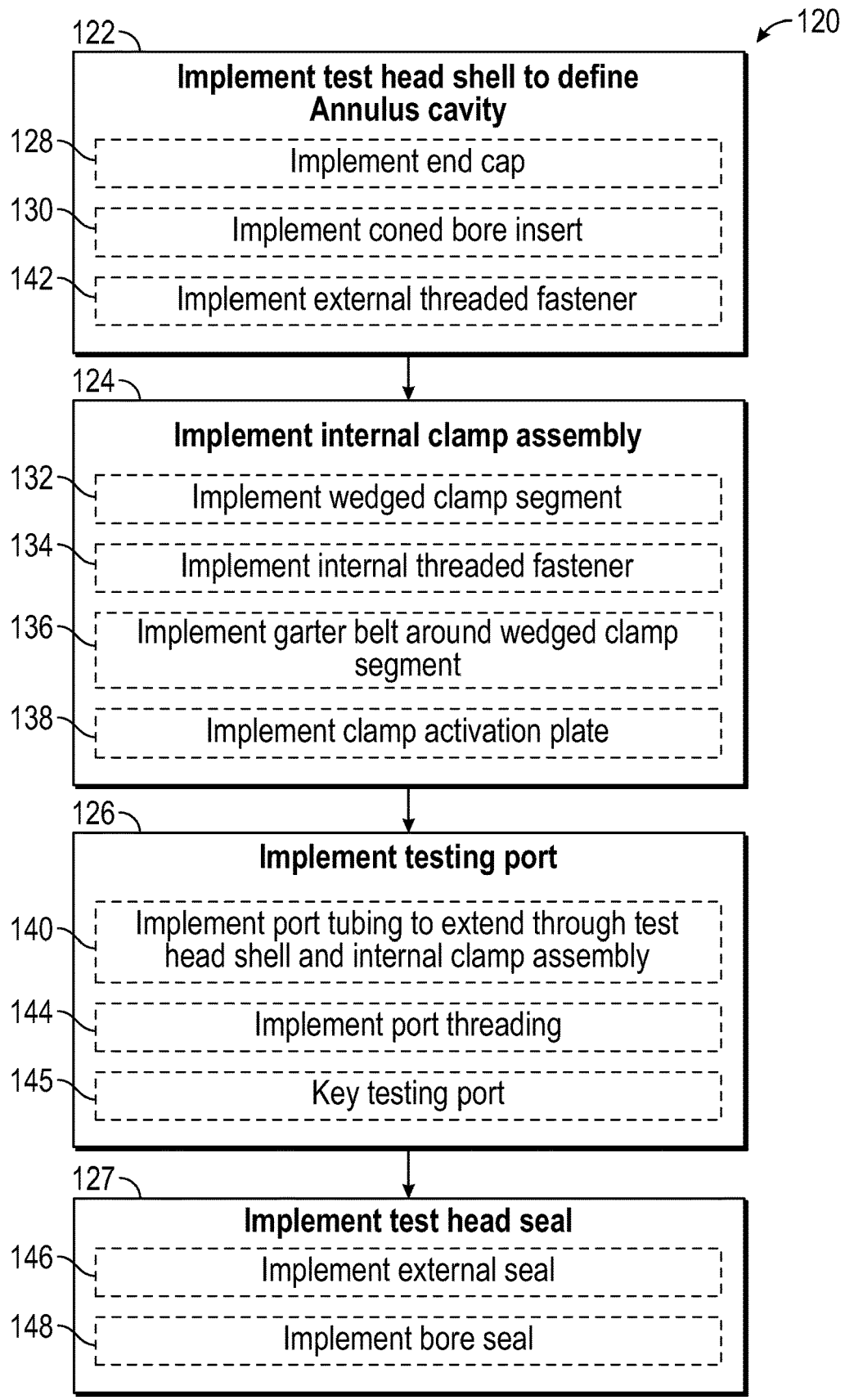
FIG. 10 is flow diagram of an example process for implementing the reusable test head of FIG. 6, in accordance with an embodiment of the present disclosure.

To help further illustrate, an example of a process 120 for implementing (e.g., manufacturing) a reusable test head 76 is described in FIG. 10. Generally, the process 120 includes implementing a test head shell to define an annulus cavity (process block 122) and implementing an internal clamp assembly (process block 124). Additionally, the process 120 generally includes implementing a testing port (process block 126) and implementing a test head seal (process block 127).

Although described in a specific order, which corresponds with an embodiment of the present disclosure, it should be appreciated that the example process 120 is merely intended to be illustrative and non-limiting. In particular, in other embodiments, a process 120 for implementing a reusable test head 76 may include one or more additional process blocks and/or omit one or more of the depicted process blocks. Additionally or alternatively, in other embodiments, the depicted process blocks may be performed in an order different from the depicted order.

In any case, as described above, a reusable test head 76 may include a shell 74. In particular, as described above, the reusable test head shell 74 may be implemented to define an annulus cavity 78, which is to be used to interface with the tubing 22 and, thus, the tubing annulus 25 of a pipe segment 20. In other words, implementing the reusable test head 76 may include implementing a reusable test head shell 74 to define the annulus cavity 78 (process block 122).

Additionally, as described above, in some embodiments, a reusable test head shell 74 may include an end cap 92, which is implemented to externally cover an open end of a pipe segment 20. In other words, in such embodiments, implementing the reusable test head shell 74 may include implementing an end cap 92 that is to be used to externally cover the open end of the pipe segment 20 (process block 128). More specifically, in some embodiments, the end cap 92 may be implemented at least in part by milling the end cap 92 from a block of material, such as metal. Additionally or alternatively, the end cap 92 may be implemented at least in part by deforming (e.g., bending and/or molding) material, such as metal or plastic.

Furthermore, as described above, in some embodiments, a reusable test head shell 74 may include a bore insert 90, which is implemented to be inserted into a pipe bore 32 of a pipe segment 20. In particular, as described above, in some such embodiments, the shell bore insert 90 may be a coned bore insert 90, which has a male taper and, thus, a cone-shaped axial cross-section profile. In other words, in such embodiments, implementing the reusable test head shell 74 may include implementing a coned bore insert 90A (process block 130). More specifically, in some embodiments, the coned bore insert 90A may be implemented at least in part by milling the coned bore insert 90A from a block of material, such as metal. Additionally or alternatively, the coned bore insert 90A may be implemented at least in part by deforming (e.g., bending and/or molding) material, such as metal or plastic.

As described above, to facilitate providing test head reusability and, thus, improving pipeline testing efficiency, the reusable test head 76 may include one or more reusable fastener mechanisms 80. In particular, in some embodiments, a reusable fastener mechanism 80 of the reusable test head 76 may be an internal clamp assembly 86. In other words, in such embodiments, implementing the reusable test head 76 may include implementing one or more internal (e.g., reusable) clamp assemblies 86 (process block 124).

Additionally, as described above, in some embodiments, an internal clamp assembly 86 may include one or more clamp segments 95, which each include a diagonal surface 117 that is implemented to slidably interface with the outer surface 118 of a corresponding coned bore insert 90A. In particular, in some such embodiments, a clamp segment 95 of the internal clamp assembly 86 may be implemented with a female taper (e.g., socket) and, thus, a wedge-shaped axial cross-section profile. In other words, in such embodiments, implementing the internal clamp assembly 86 may include implementing one or more wedged clamp segments 95 (process block 132). More specifically, in some embodiments, a wedged clamp segment 95 may be implemented at least in part by milling the wedged clamp segment 95 from a block of material, such as metal. Additionally or alternatively, the wedged clamp segment 95 may be implemented at least in part by deforming (e.g., bending and/or molding) material, such as metal or plastic.

Furthermore, as described above, the clamp segment outer surface diameter and, thus, the activation state of the internal clamp assembly 86 may be controlled to facilitate selectively securing the reusable test head 76 to a pipe segment 20. In particular, while the internal clamp assembly 86 is in its activated state, the clamp segment outer surface diameter may be greater than or equal to (e.g., not less than) a default (e.g., natural, original, and/or uncompressed) inner surface diameter of the tubing 22 of the pipe segment 20 and, thus, facilitate securing the reusable test head 76 to the pipe segment 20. On the other hand, while the internal clamp assembly 86 is in a deactivated state, the clamp segment outer surface diameter may be less than the default inner surface diameter of the tubing 22 of the pipe segment 20 and, thus, enable the pipe segment tubing to be inserted and/or withdrawn from the annulus cavity 78 of the reusable test head 76.

Moreover, as described above, the clamp segment outer surface diameter and, thus, the activation state of an internal clamp assembly 86 may be controlled at least in part by controlling the position of one or more of its wedged clamp segments 95 on a corresponding coned bore insert 90A. As described above, to facilitate controlling clamp segment position on the coned bore insert 90A, in some embodiments, the one or more wedged clamp segments 95 may be coupled between the coned bore insert 90A and an internal threaded fastener 101, such as a nut. In other words, in such embodiments, implementing the internal clamp assembly 86 may include implementing an internal threaded fastener 101 such that one or more wedged clamp segments 95 may be coupled between the coned bore insert 90A and the internal threaded fastener 101 (process block 134).

Additionally, as described above, in some embodiments, an internal clamp assembly 86 may include a garter belt 97 implemented circumferentially along an outer surface 105 of the wedged clamp segments 95, for example, to facilitate contracting the outer surface diameter of the wedged clamp segments 95 and/or moving multiple wedged clamp segments 95 together as a unit. In other words, in such embodiments, implementing the internal clamp assembly 86 may include implementing a garter belt 97 circumferentially around the outer surface 105 of one or more of its wedged clamp segments 95 (process block 136). In particular, in some embodiments, the garter belt 97 may be implemented at least in part by stretching elastic material, such as rubber, circumferentially around the outer surface 105 of the wedged clamp segments 95.

Furthermore, as described above, in some embodiments, an internal clamp assembly 86 may include a clamp activation plate 99 coupled between the internal threaded fastener 101 and its wedged clamp segments 95, for example, to facilitate moving multiple wedged clamp segments 95 together as a unit. In other words, in such embodiments, implementing the internal clamp assembly 86 may include implementing a clamp activation plate 99, which is to be coupled between the internal threaded fastener 101 and the wedged clamp segments 95 (process block 138). More specifically, in some embodiments, the clamp activation plate 99 may be implemented at least in part by milling the clamp activation plate 99 from a block of material, such as metal. Additionally or alternatively, the clamp activation plate 99 may be implemented at least in part by deforming (e.g., bending and/or molding) material, such as metal or plastic.

However, it should again be appreciated that the depicted example is merely intended to be illustrative and not limiting. In particular, as described above, in other embodiments, an internal clamp assembly 86 may not include a garter belt 97 and/or a clamp activation plate 99, for example, when the internal clamp assembly 86 includes a single flower-shaped clamp segment 95 instead of multiple discrete clamp segments 95. In other words, in such embodiments, implementing an internal clamp assembly 86 may not include implementing a garter belt 97 and/or implementing a clamp activation plate 99.

In any case, to facilitate testing pipe segment integrity, as described above, a reusable test head 76 may include one or more testing ports 82 that open through its shell 74. In other words, implementing the reusable test head 76 may include implementing one or more testing ports 82 (process block 126). In particular, in some embodiments, implementing a testing port 82 may include implementing port tubing 94 to define (e.g., enclose) a port bore 96, which will extend through the shell 74 of the reusable test head 76, and implementing one or more port openings 102 in the port tubing 94 to facilitate fluidly coupling the port bore 96 to the annulus cavity 78 of the reusable test head 76.

In addition to the shell 74 of the reusable test head 76, in some embodiments, the port tubing 94 may be implemented to extend through the internal clamp assembly 86 of the reusable test head 76. In particular, in some such embodiments, the port tubing 94 may be implemented to extend through one or more opening in the internal clamp assembly 86 as well as through one or more openings in reusable test head shell 74. In other words, in such embodiments, implementing the test port 82 may include implementing port tubing 94 to extend through the reusable test head shell 74 and the internal clamp assembly 86 (process block 140). For example, in some embodiments, the port tubing 94 may be implemented to extend through an opening in the coned bore insert 90A of the reusable test head shell 74, an opening between wedged clamp segments 95 of the internal clamp assembly 86, an opening in the clamp activation plate 99 of the internal clamp assembly 86, and an opening in the end cap 92 of the reusable test head shell 74 such that a closed (e.g., blind flanged) end 98 of the port tubing 94 is on a first (e.g., internal) side of the coned bore insert 90A while an open end 100 of the port tubing 94 is on a second (e.g., external and/or opposite) side of the end cap 92.

In fact, since extending through its shell 74 and its internal clamp assembly 86, in some embodiments, the testing port 82 of the reusable test head 76 may be coupled to the shell 74 as well as the internal clamp assembly 86 and, thus, facilitate securing (e.g., coupling) the internal clamp assembly 86 to the shell 74 of the reusable test head 76. In particular, as described above, in some embodiments, an end cap 92 of a reusable test head shell 74 may be coupled to a testing port 82 via an external threaded fastener 93, which includes external fastener threading 104 that is implemented to matingly interface with external port threading 106A on the testing port 82. In other words, in such embodiments, implementing the reusable test head shell 74 may include implementing an external threaded fastener 93 (process block 142) and implementing the testing port 82 may include implementing port threading 106 (e.g., external port threading 106A), which matingly interfaces with external fastener threading 104 on the external threaded fastener 93, circumferentially along an outer surface of the testing port 82 (process block 144).

Additionally, as described above, in some embodiments, an internal clamp assembly 86 of a reusable test head 76 may be coupled to a testing port 82 via an internal threaded fastener 101, which includes internal fastener threading 112 that is implemented to matingly interface with internal port threading 106B on the testing port 82. In other words, in such embodiments, implementing the testing port 82 may include implementing port threading 106 (e.g., internal port threading 106B), which matingly interfaces with internal fastener threading 112 on the internal threaded fastener 101, circumferentially along an outer surface of the testing port 82 (process block 144). In fact, as described above, in some such embodiments, internal port threading 106B and external port threading 106A on a testing port 82 may be implemented with different outer surface diameters. For example, the internal port threading 106B may be implemented with a larger outer surface diameter while the external port threading 106A is implemented with a small outer surface diameter, thereby producing a port ledge 108 therebetween.

Furthermore, as described above, to facilitate rotating a threaded fastener (e.g., internal threaded fastener 101 or external threaded fastener 93) relative to a testing port 82 of a reusable test head 76, in some embodiments, the testing port 82 may be keyed. In other words, in such embodiments, implementing the testing port 82 may include keying the testing port (process block 145). In particular, in some embodiments, testing port 82 may be keyed with one or more flat outer surfaces, for example, which are implemented to enable a wrench to grab onto the testing port 82 while a threaded fastener is being rotated thereon. Additionally or alternatively, the open end 100 of the testing port 82 may be keyed with one or more flat inner surfaces, for example, which are implemented to enable a keyed shaft to matingly interlock with the testing port 82 while a threaded fastener is being rotated thereon.

Moreover, as described above, the reusable test head 76 may include one or more test head seals 84. In other words, implementing the reusable test head 76 may include implementing one or more test head seals 84 (process block 127). In some embodiments, a test head seal 84 may be implemented at least in part using elastic material, such as rubber.

As described above, in some embodiments, the test head seals 84 of a reusable test head 76 may include one or more external seals 84, which are implemented to facilitate sealing conditions within the annulus cavity 78 of the reusable test head 76 from external environmental conditions. In other words, in such embodiments, implementing the test head seal 84 may include implementing one or more external seals 84 (process block 146). For example, an outer external seal 84A may be implemented circumferentially along an inner surface 110 of the end cap 92. Additionally or alternatively, an inner external seal 84B may be implemented to be coupled between an inner surface 110 of the end cap 92 and a port ledge 108 on the testing port 82.

In fact, as will be described in more detail below, in some embodiments, a process for selectively securing the end cap 92 to the testing port 82 may facilitate selectively sealing the annulus cavity 78 of the reusable test head 76 from external environmental conditions. For example, tightening the external threaded fastener 93 on the testing port 82 may compress the outer external seal 84A against the pipe segment tubing 22, which, at least in some instances, may facilitate blocking fluid flow directly between the annulus cavity 78 and the external environmental conditions. Additionally or alternatively, tightening the external threaded fastener 93 on the testing port 82 may compress the inner external seal 84B between the port ledge 108 on the testing port 82 and the inner surface 110 of the end cap 92A, which, at least in some instances, may facilitate blocking fluid flow directly between the annulus cavity 78 and the external environmental conditions.

Furthermore, as described above, in some embodiments, the test head seals 84 of the reusable test head 76 may include one or more bore seals 84, which are implemented to facilitate sealing conditions within the annulus cavity 78 of the reusable test head 76 from conditions within a pipe bore 32. In other words, in such embodiments, implementing the test head seal 84 may include implementing one or more bore seals 84 (process block 148). For example, an outer bore seal 84C may be implemented to be coupled circumferentially between the coned bore insert 90A and one or more wedged clamp segments 95. Additionally or alternatively, an inner bore seal 84 may be implemented to be coupled circumferentially between the closed (e.g., blind flanged) end 98 of the testing port 82 and the coned bore insert 90A.

In fact, as will be described in more detail below, in some embodiments, a process for selectively securing the internal clamp assembly 86 to the testing port 82 may facilitate sealing conditions within its the annulus cavity 78 from conditions within the pipe bore 32. For example, tightening the internal threaded fastener 101 on the testing port 82 may compress the outer bore seal 84C between one or more wedged clamp segments 95 and the coned bore insert 90A such that the outer bore seal 84C is compressed against an inner surface 116 of the pipe segment tubing 22, which, at least in some instances, may facilitate blocking fluid flow directly between the annulus cavity 78 and the pipe bore 32. Additionally or alternatively, tightening the internal threaded fastener 101 may compress the inner bore seal 84D between the closed end 98 of the testing port 82 and the coned bore insert 90A, which, at least in some instances, may facilitate blocking fluid flow directly between the annulus cavity 78 and the pipe bore 32.

Moreover, as described above, the position of the internal threaded fastener 101 on the testing port 82 may be used to facilitate controlling the outer surface diameter of one or more wedged clamp segments 95 and, thus, the activation state of the internal clamp assembly 86. In particular, in some embodiments, tightening the internal threaded fastener 101 may move the internal threaded fastener 101 toward the coned bore insert 90A, thereby causing a wedged clamp segment 95 coupled therebetween to cover more of the coned bore insert 90A and, thus, a resulting clamp segment outer surface diameter to expand outwardly. On the other hand, loosening the internal threaded fastener may move the internal threaded fastener 101 away from the coned bore insert 90A, thereby enabling the wedged clamp segment 95 coupled therebetween to cover less of the coned bore insert 90A and, thus, a resulting clamp segment outer surface diameter to contract inwardly. In other words, implementing a reusable test head 76 in this manner may enable the reusable test head 76 to be selectively secured to and, thus, used to test integrity of multiple different pipe segments 20, which, at least in some instances, may facilitate improving testing efficiency for a pipeline system 10 in which the pipe segments 20 are or are to be deployed.

Figure 11:
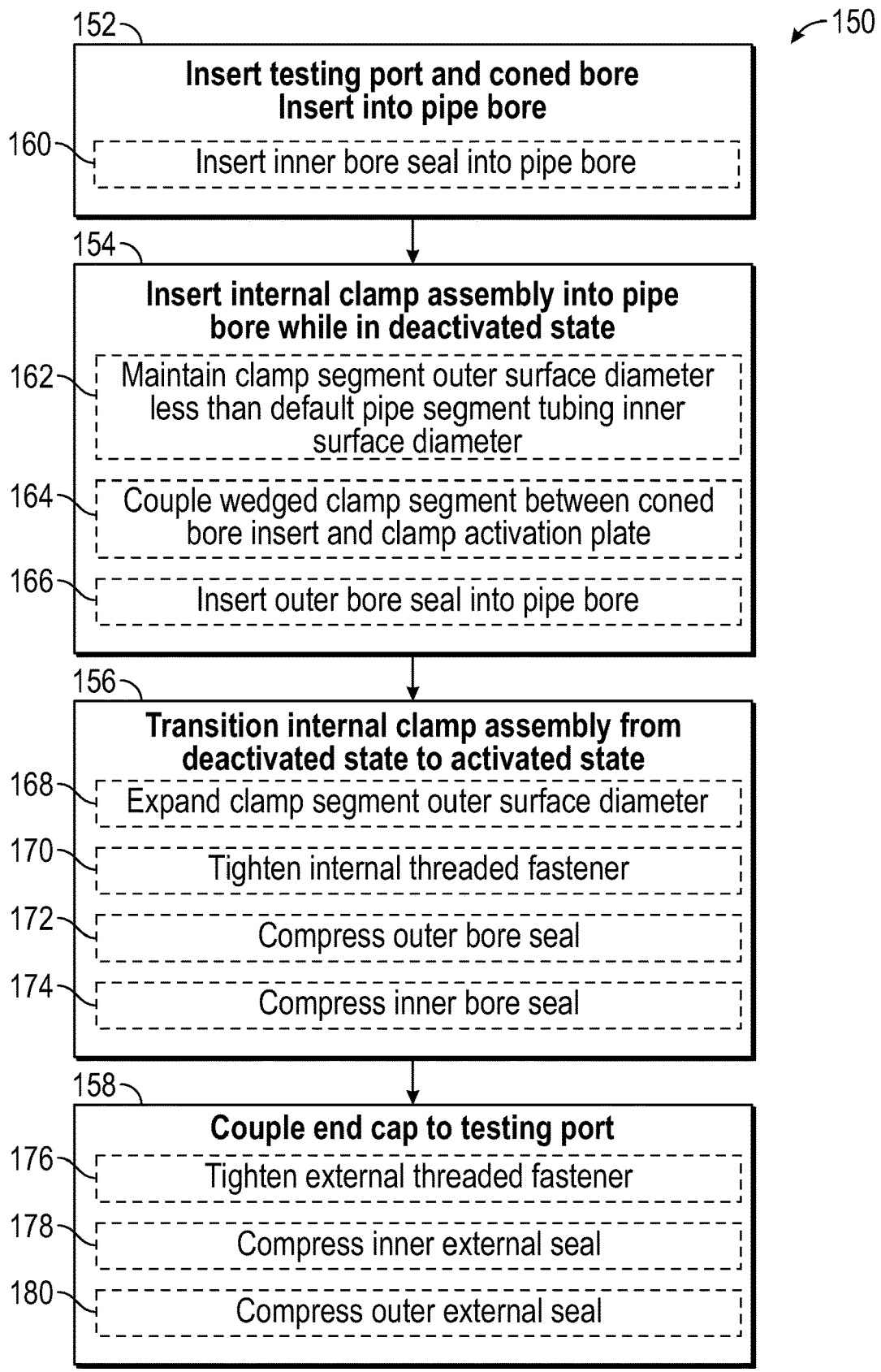
FIG. 11 is a flow diagram of an example process for selectively deploying the reusable test head of FIG. 6 at a pipe segment, in accordance with an embodiment of the present disclosure.

To further help illustrate, an example of a process 150 for selectively securing a reusable test head 76 to a pipe segment 20 is described in FIG. 11. Generally, the process 150 includes inserting a testing port and a coned bore insert into a pipe bore (process block 152) and inserting an internal clamp assembly into the pipe bore while in a deactivated state (process block 154). Additionally, the process 150 generally includes transitioning the internal clamp assembly from the deactivated state to an activated state (process block 156) and coupling an end cap to the testing port (process block 158).

Although described in a specific order, which corresponds with an embodiment of the present disclosure, it should be appreciated that the example process 150 is merely intended to be illustrative and not limiting. In particular, in other embodiments, a process 150 for selectively securing a reusable test head 76 to a pipe segment 20 may include one or more additional process blocks. Additionally or alternatively, in other embodiments, a process 150 for selectively securing a reusable test head 76 to a pipe segment 20 may omit one or more of the depicted process blocks.

As described above, the shell 74 of a reusable test head 76 may include a coned bore insert 90A, which is implemented to be inserted into a pipe bore 32 defined (e.g., enclosed) by the tubing 22 of a pipe segment 20. Additionally, as described above, the coned bore insert 90A may be coupled to a testing port 82 of the reusable test head 76 and, thus, at least a portion of the testing port 82 may also be implemented to be inserted into the pipe bore 32. As such, deploying the reusable test head 76 at the pipe segment 20 may include inserting the coned bore insert 90A and at least a portion of the testing port 82 into the pipe bore 32 of the pipe segment 20 (process block 152). In particular, in some embodiments, the coned bore insert 90A and the testing port 82 may be inserted into the pipe bore 32 through an open end of the pipe segment 20 such that a closed end 98 of the testing port 82 and an inner surface 119 of the coned bore insert 90A are oriented toward the opposite end of the pipe segment 20.

Additionally, as described above, in some embodiments, an inner bore seal 84D may be coupled between the coned bore insert 90A and the testing port 82. In particular, in some such embodiments, the inner bore seal 84D may be coupled between the closed end 98 of the testing port 82 and the inner surface 119 of the coned bore insert 90A. Thus, in such embodiments, inserting the inserting the coned bore insert 90A and at least a portion of the testing port 82 into the pipe bore 32 may include inserting the inner bore seal 84D into the pipe bore 32 of the pipe segment 20 (process block 160).

An internal clamp assembly 86 of the reusable test head 76 may then be inserted into the pipe bore 32 while it is in a deactivated state (process block 154). As described above, in some embodiments, an internal clamp assembly 86 may be in a deactivated state when the outer surface diameter of its one or more wedged clamp segments 95 is less than a default (e.g., original, initial, and/or undeformed) inner surface diameter of pipe segment tubing 20 to be tested using the reusable test head 76. In other words, in such embodiments, inserting the internal clamp assembly 86 into the pipe bore 32 may include inserting the internal clamp assembly 86 into the pipe bore 32 while its clamp segment outer surface diameter is maintained less than the default inner surface diameter of the pipe segment tubing 22 (process block 162).

As described above, in some embodiments, the one or more wedged clamp segments 95 of the internal clamp assembly 86 may be coupled between an outer surface 118 of the coned bore insert 90A and a clamp activation plate 99 of the internal clamp assembly 86. In other words, in such embodiments, inserting the internal clamp assembly 86 into the pipe bore 32 may include coupling one or more wedged clamp segments 95 between the coned bore insert 90A and the clamp activation plate 99 (process block 164). In particular, to facilitate selectively (e.g., adaptively and/or dynamically) controlling the activation state of the internal clamp assembly 86, a wedged clamp segments 95 may be inserted into the pipe bore 32 such that its diagonal surface 117 slidably interfaces with the outer surface 118 of the coned bore insert 90A. Additionally, in some such embodiments, the wedged clamp segments 95 may be inserted into the pipe bore 32 such that the testing port 82 extends through an opening in the wedged clamp segment 95 or an opening between the wedged clamp segment 95 and another wedged clamp segment 95.

Furthermore, as described above, in some embodiments, an outer bore seal 84C may be coupled circumferentially between one or more wedged clamp segments 95 of the internal clamp assembly 86 and the coned bore insert 90A. In particular, in some such embodiments, the outer bore seal 84C may be coupled between the outer surface 118 of the coned bore insert 90A and a side surface of a wedged clamp segment 95, which extends between its outer surface 105 and its diagonal surface 117. Thus, in such embodiments, inserting the internal clamp assembly 86 into the pipe bore 32 may include inserting the outer bore seal 84C into the pipe bore 32 (process block 166).

After insertion into the pipe bore 32, the internal clamp assembly 86 may be transitioned from the deactivated state to its activated state (process block 156). As described above, in some embodiments, the internal clamp assembly 86 may be in a deactivated state while its clamp segment outer surface diameter is less than the default inner surface diameter of pipe segment tubing 22 that defines the pipe bore 32 and in its activated state while its clamp segment outer surface diameter is greater than or equal to the default inner surface diameter of the pipe segment tubing 22. In other words, in such embodiments, transitioning the internal clamp assembly 86 to its activated state may include expanding its clamp segment outer surface diameter outwardly, for example, such that the clamp segment outer surface diameter matches or even exceeds the default inner surface diameter of the pipe segment tubing 22 (process block 168).

Additionally, as described above, in some embodiments, the clamp segment outer surface diameter and, thus, the activation state of the internal clamp assembly 86 may be controlled at least in part by controlling the position of its one or more wedged clamp segments 95 on the coned bore insert 90A. In particular, in some embodiments, moving a wedged clamp segment 95 to cover more of the coned bore insert 90A may result in the clamp segment outer surface diameter expanding outwardly and, thus, the internal clamp assembly 86 transitioning toward its activated state. Furthermore, as described above, in some embodiments, a wedged clamp segment 95, which is coupled between the coned bore insert 90A and an internal threaded fastener 101, may be moved (e.g., forced) toward the coned bore insert 90A at least in part by tightening the internal threaded fastener 101 on port threading 106 (e.g., internal port threading 106B) of the testing port 82 that matingly interfaces with internal fastener threading 112 on the internal threaded fastener 101. In other words, in such embodiments, transitioning the internal clamp assembly 86 toward its activated state may include tightening the internal threaded fastener 101 on the testing port 82, for example, at least in part by rotationally actuating the internal threaded fastener 101 in a first (e.g., clockwise) direction relative to the testing port 82 (process block 170).

Moreover, as described above, in some embodiments, an outer bore seal 84C may be implemented between the coned bore insert 90A and one or more wedged clamp segments 95. In other words, in such embodiments, transitioning the internal clamp assembly 86 toward its activated state at least part by moving one or more of its wedged clamp segments 95 to cover more of the coned bore insert 90A may compress the outer bore seal 84C therebetween, for example, such that the outer bore seal 84C is extruded (e.g., compressed) against the inner surface 116 of the pipe segment tubing 22 that defines the pipe bore 32 (process block 172). As described above, in some embodiments, a reusable test head 76 may additionally or alternatively include an inner bore seal 84D implemented between a closed end 98 of the testing port 82 and an inner surface of the coned bore insert 90A. Since tightening the internal threaded fastener 101 may force (e.g., pull) the closed end 98 of the testing port 82 toward the coned bore insert 90, in such embodiments, transitioning the internal clamp assembly 86 toward its activated state may include compressing the inner bore seal 84D between the testing port 82 and the coned bore insert 90A (process block 174).

After the internal clamp assembly 86 is transitioned to its activated state, an end cap 92 of the reusable test head 76 may be coupled to the testing port 82, for example, such that the end cap external covers an open end of the pipe segment tubing 22 that defines the pipe bore 32 (process block 158). As described above, in some embodiments, the end cap 92 may be coupled to the testing port 82 via an external threaded fastener 93, for example, such that the end cap 92 is coupled between the external threaded fastener 93 and a port ledge 108 on the testing port 82. In other words, in such embodiments, the end cap 92 may be secured (e.g., coupled) to the testing port 82 at least in part by tightening the external threaded fastener 93 on the testing port 82, for example, at least in part by rotationally actuating the external threaded fastener 93 in a first (e.g., clockwise) direction relative to the testing port 82 (process block 176).

Additionally, as described above, in some embodiments, the reusable test head 76 may include an inner external seal 84B coupled between the port ledge 108 on the testing port 82 and the inner surface 110 of the end cap 92. Since tightening the external threaded fastener 93 may force (e.g., push) the inner surface 110 of the end cap 92 toward the port ledge 108, in such embodiments, coupling the end cap 92 to the testing port 82 may include compressing the inner external seal 84B between the end cap 92 and the port ledge 108 (process block 178). Furthermore, as described above, in some embodiments, the reusable test head 76 may additionally or alternatively include an outer external seal 84A implemented circumferentially along an inner surface 110 of the end cap 92. Since tightening the external threaded fastener 93 may force (e.g., push) the inner surface 110 of the end cap 92 toward the pipe segment tubing 22 that defines the pipe bore 32, in such embodiments, coupling the end cap 92 to the testing port 82 may include compressing the outer external seal 84A against the pipe segment tubing 22 (process block 180). In this manner, a reusable test head 76 may be selectively deployed at and, thus, used to facilitate testing integrity of a pipe segment 20, which, at least in some instances, may facilitate improving testing efficiency of a pipeline system 10, for example, by obviating the use of a new (e.g., different) test head 44 for testing each pipe segment 20 deployed or to be deployed in the pipeline system 10.

Figure 12:
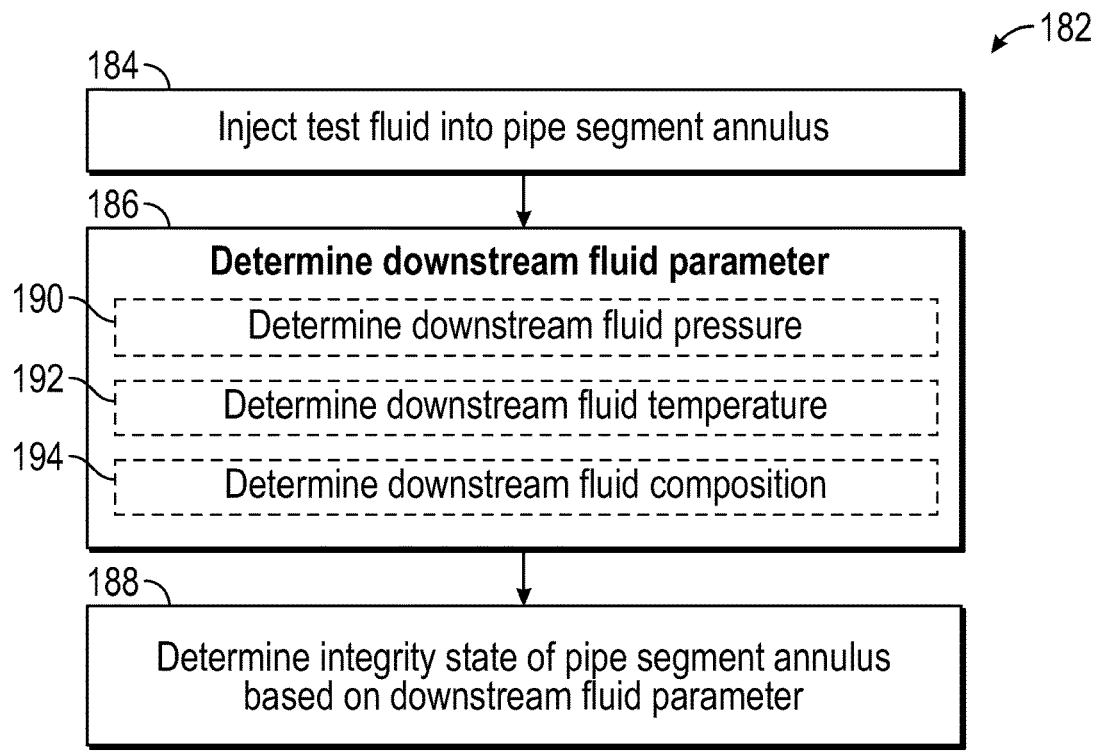
FIG. 12 is flow diagram of an example process for testing integrity of a pipe segment, in accordance with an embodiment of the present disclosure.

Returning to the process 62 of FIG. 5, the testing system 38 may then perform an integrity test on a pipe segment 20 secured to the test head 44 (e.g., reusable test head 76) (process block 66). To help illustrate, an example of a process 182 for testing pipe segment integrity is described in FIG. 12. Generally, the process 182 includes injecting test fluid into a pipe segment annulus (process block 184), determining a downstream fluid parameter (process block 186), and determining integrity state of the pipe segment annulus based on the downstream fluid parameter (process block 188).

Although described in a specific order, which corresponds with an embodiment of the present disclosure, it should be appreciated that the example process 182 is merely intended to be illustrative and non-limiting. In particular, in other embodiments, a process 182 for performing a pipe segment integrity test may include one or more additional process blocks and/or omit one or more of the depicted process blocks. Moreover, in some embodiments, the process 182 may be performed at least in part by executing instructions stored in a tangible, non-transitory, computer-readable medium, such as memory 52 in a testing device 40, using processing circuitry, such as a processor 50 in the testing device 40.

For example, in some such embodiments, a testing device 40 in a testing system 38 may instruct the testing system 38 to inject test fluid (e.g., gas and/or liquid) into the tubing annulus 25 of a pipe segment 20 that is secured to a test head 44 (e.g., reusable test head 76) in the testing system 38 (process block 184). As described above, in some embodiments, one or more fluid conduits 24 may be implemented in the annulus 25 (e.g., one or more intermediate layers 34) of pipe segment tubing 22. Additionally, as described above, a fluid conduit 24 implemented in the tubing annulus 25 may be fluidly coupled to a testing port 82 on the shell 74 of a reusable test head 76 when the pipe segment tubing 22 is present in the annulus cavity 78 of the reusable test head 76. Furthermore, as described above, in some embodiments, a testing port 82 on the shell 74 of a reusable test head 76 may be fluidly coupled to one or more test fluid sources 42. Thus, to inject test fluid into the tubing annulus 25, in such embodiments, the testing device 40 may selectively instruct a test fluid source 42 to supply (e.g., pump and/or flow) the test fluid to the testing port 82 implemented on the shell 74 of the reusable test head 76, for example, via one or more control signals 58. In other embodiments, an operator (e.g., user) may manually control injection of the test fluid, for example, by selectively turning on a test fluid pump and/or adjusting valve position of a value fluidly coupled to the testing port 82.

Moreover, as described above, in some embodiments, the test fluid may be an inert fluid, such as nitrogen (e.g., $N_2$) gas, for example, to facilitate reducing the likelihood that the test fluid itself affects (e.g., reduces) integrity of pipe segment tubing 22. In any case, as will be described in more detail below, in some embodiments, the integrity state of pipe segment tubing 22 may be determined based at least in part on one or more fluid parameters, such as temperature, pressure, and/or composition, of the test fluid. In some such embodiments, one or more fluid parameters of the test fluid may be pre-determined, for example, offline by a test lab and/or a fluid supplier and stored in memory 52 of the testing system 38. Additionally or alternatively, one or more fluid parameters of the test fluid may be determined while the test fluid is being supplied to a fluid conduit 24 implemented in an intermediate layer 34 of the pipe segment tubing 22, for example, online and/or in real-time via one or more sensors 43.

Furthermore, the testing system 38 may determine one or more downstream fluid parameters that result from injection of the test fluid into one or more fluid conduits 24 implemented in the annulus 25 (e.g., one or more intermediate layers 34) of the pipe segment tubing 22 (process block 186). As described above, in some embodiments, the one or more downstream fluid parameters may include a downstream fluid pressure determined (e.g., measured and/or sensed) by a pressure sensor 43, a downstream fluid temperature determined by a temperature sensor 43, and/or a downstream fluid composition determined by a fluid composition sensor 43. Thus, in such embodiments, determining the one or more downstream fluid parameters may include determining a downstream fluid pressure (process block 190), determining a downstream fluid temperature (process block 192), determining a downstream fluid composition (process block 194), or any combination thereof, for example, based at least in part on corresponding sensor signals 56 received from one or more sensors 43.

The testing system 38 may then determine an integrity state of the pipe segment tubing 22 based at least in part on the one or more downstream fluid parameters (process block 188). As described above, the tubing 22 of a pipe segment 20 is generally implemented to facilitate isolating (e.g., insulating) conditions internal to the pipe segment 20 from environmental conditions external to the pipe segment 20. Generally, when a defect is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with a non-faulty (e.g., non-defective) pipe segment tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof.

In other words, at least in some instances, an actual fluid parameter change that differs (e.g., deviates) from a corresponding expected (e.g., predicted) fluid parameter change may be indicative of a defect being present on pipe segment tubing 22. For example, an actual fluid pressure change (e.g., drop) that differs from an expected fluid pressure change may be indicative of fluid leaking from a fluid conduit 24 implemented in an intermediate layer 34 of the pipe segment tubing 22 and, thus, that the pipe segment tubing 22 is potentially faulty (e.g., defective). Additionally, an actual fluid temperature change (e.g., increase or decrease) that differs from an expected fluid temperature change may be indicative increased heat transfer between a fluid conduit 24 implemented in an intermediate layer 34 of the pipe segment tubing 22 and conditions external to the pipe segment tubing 22 and, thus, that the pipe segment tubing is potentially faulty and/or that the external (e.g., environmental and/or bore) conditions will potentially shorten the lifespan of the pipe segment tubing 22. Furthermore, an actual fluid composition change that differs from an expected fluid composition change may be indicative of conditions external to the pipe segment tubing 22 contaminating the conditions in a fluid conduit 24 implemented in an intermediate layer 34 of the pipe segment tubing 22 and, thus, that the pipe segment tubing 22 is potentially faulty.

To determine an actual fluid parameter change, the testing system 38 may compare a downstream fluid parameter with a corresponding fluid parameter of the test fluid. For example, the testing system 38 may determine an actual fluid pressure change at least in part by comparing the downstream fluid pressure with the fluid pressure of the test fluid. Additionally, the testing system 38 may determine an actual fluid temperature change at least in part by comparing the downstream fluid temperature with the fluid temperature of the test fluid. Furthermore, the testing system 38 may determine an actual fluid temperature change at least in part by comparing the downstream fluid temperature with the fluid temperature of the test fluid.

In some embodiments, the testing system 38 may identify that the integrity state of the pipe segment tubing 22 is a non-faulty (e.g., non-defective) state when each of the actual fluid parameter changes does not differ from a corresponding expected fluid parameter change by more than an error threshold, for example, which accounts for sensor (e.g., measurement) error. On the other hand, the testing system 38 may identify that the integrity state of the pipe segment tubing 22 is a faulty (e.g., defective) state when one or more of the actual fluid parameter changes differs from a corresponding expected (e.g., predicted) fluid parameter change, for example, by more than a corresponding error threshold. Moreover, when the integrity state is a faulty state, in some embodiments, the testing system 38 may identify an expected type and/or an expected location of one or more defects on the pipe segment tubing 22, for example, based at least in part on where the downstream fluid parameters are sensed and/or how an actual fluid parameter change deviates from a corresponding expected fluid parameter change. In this manner, a testing system 38 may be operated to perform a cycle of a pipe segment integrity test.

Returning to the process 62 of FIG. 5, the testing system 38 may determine whether the pipe segment 20 being tested has passed the integrity test (decision block 68). In particular, the testing system 38 may determine that the pipe segment 20 has passed when the annulus integrity test determines that the integrity state of its tubing 22 is a non-faulty (e.g., non-defective) state. On the other hand, the testing system 38 may determine that the pipe segment 20 has not passed when the annulus integrity test determines that the integrity state of its tubing 22 is a faulty (e.g., defective) state.

To facilitate improving operational efficiency and/or operational reliability of a pipeline system 10 in which the pipe segment 20 is or is to be deployed, when the pipe segment 20 has not passed the annulus integrity test, one or more defects on its tubing 22 may be fixed (e.g., ameliorated), for example, by a user (e.g., operator) of the testing system 38 (process block 72). To facilitate communicating results of the annulus integrity test, in some embodiments, the testing system 38 may instruct an I/O device 54, such as an electronic display, to display a graphical user interface (GUI) that provides a visual representation of the annulus integrity test results. For example, the graphical user interface may include a visual representation of the integrity state of the pipe segment tubing 22, an expected type of defect present on the pipe segment tubing 22, and/or an expected location of a defect on the pipe segment tubing 22. In fact, in some embodiments, another cycle of the integrity test may be performed on the pipe segment 20 once a defect in its tubing 22 is believed to have been fixed (arrow 196)

On the other hand, when the pipe segment 20 has passed the integrity test, the test head 44 (e.g., reusable test head 76) may be removed from the pipe segment 20 (process block 70). In particular, as described above, in some embodiments, a reusable test head 76 may include a reusable fastener mechanism 80—namely an internal (e.g., reusable) clamp assembly 86. Additionally, as described above, in some embodiments, an open end of pipe segment tubing 22 may be sealed and secured in the annulus cavity 78 of the reusable test head 76 while the internal clamp assembly 86 is in its activated state. On the other hand, as described above, the internal clamp assembly 86 may allow for more movement in the annulus cavity 78 of the reusable test head 76 while in a deactivated state. Thus, in such embodiments, the reusable test head 76 may be removed from the pipe segment 20 while the internal clamp assembly 86 is in a deactivated state.

Figure 13:
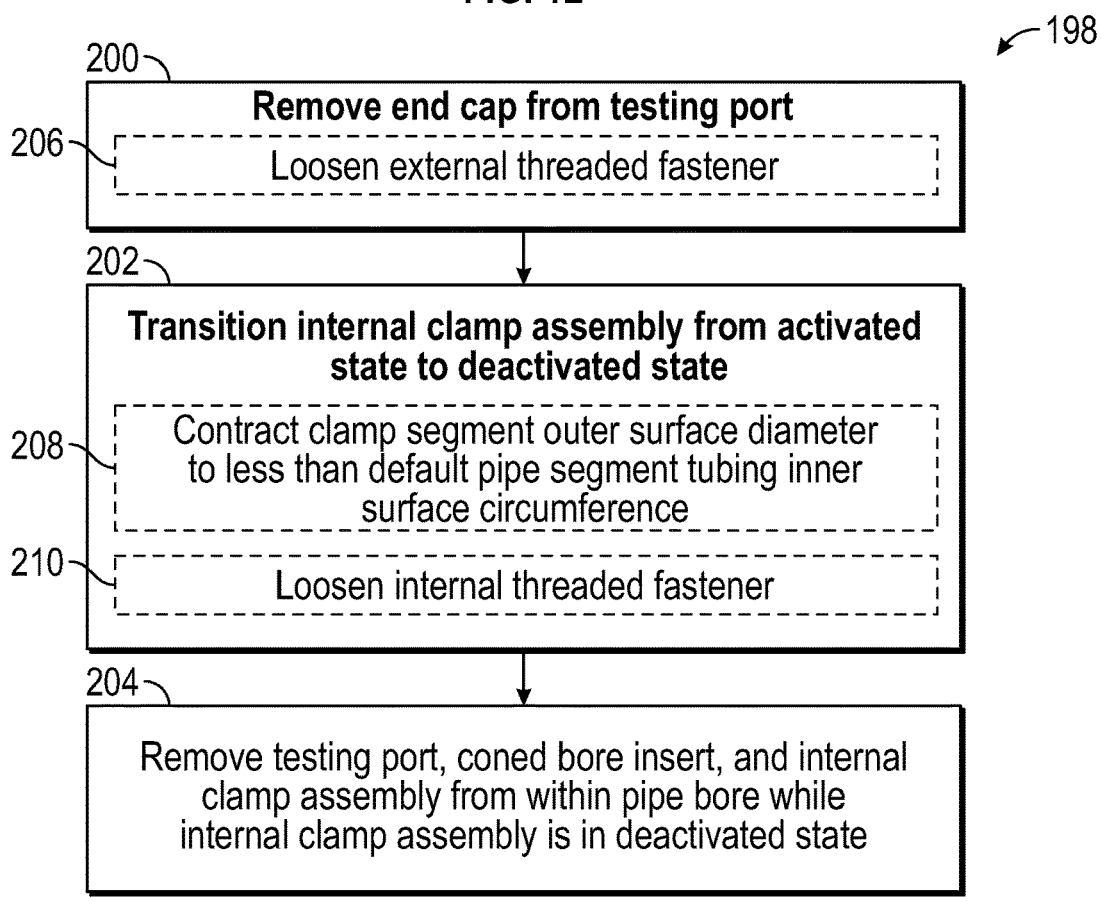
FIG. 13 is a flow diagram of an example process for selectively removing the reusable test head of FIG. 6 from a pipe segment, in accordance with an embodiment of the present disclosure.

To help further illustrate, an example of a process 198 for selectively removing a reusable test head 76 from a pipe segment 20 is described in FIG. 13. Generally, the process 198 includes removing an end cap from a testing port (process block 200) and transitioning an internal clamp assembly from its activated state to a deactivated state (process block 202). Additionally, the process 198 generally includes removing the testing port, a coned bore insert, and the internal clamp assembly from within a pipe bore while the internal clamp assembly is in a deactivated state (process block 204).

Although described in a specific order, which corresponds with an embodiment of the present disclosure, it should be appreciated that the example process 198 is merely intended to be illustrative and non-limiting. In particular, in other embodiments, a process 198 for selectively removing a reusable test head 76 from a pipe segment 20 may include one or more additional process blocks. Additionally or alternatively, in other embodiments, a process 198 for selectively removing a reusable test head 76 from a pipe segment 20 may omit one or more of the depicted process blocks.

As described above, the shell 74 of a reusable test head 76 may include an end cap 92, which is implemented to be externally cover an open end of the tubing 22 of a pipe segment 20. Additionally, as described above, the end cap 92 may be coupled to a testing port 82 of the reusable test head 76. As such, removing the reusable test head 76 from the pipe segment 20 may include removing the end cap 92 from the testing port 82 (process block 200). Furthermore, as described above, in some embodiments, the end cap 92 may be coupled to the testing port 82 via an external threaded fastener 93, which includes external fastener threading 104 that matingly interfaces with port threading 106 (e.g., external port threading 106A) on the testing port 82. In other words, in such embodiments, removing the end cap 92 may include loosening the external threaded fastener 93 from the testing port 82, for example, at least in part by rotationally actuating the external threaded fastener 93 in a second (e.g., counter-clockwise) direction relative to the testing port 82 (process block 206).

After the end cap 92 is removed, an internal clamp assembly 86 of the reusable test head 76 may be transitioned from its activated state to a deactivated state (process block 202). As described above, in some embodiments, the internal clamp assembly 86 may be in a deactivated state while its clamp segment outer surface diameter is less than the default inner surface diameter of pipe segment tubing 22 that defines the pipe bore 32 and in its activated state while its clamp segment outer surface diameter is greater than or equal to the default inner surface diameter of the pipe segment tubing 22. In other words, in such embodiments, transitioning the internal clamp assembly 86 to a deactivated state may include contracting its clamp segment outer surface diameter inwardly such that the clamp segment outer surface diameter is less than the default inner surface diameter of the pipe segment tubing 22 (process block 208).

Additionally, as described above, in some embodiments, the clamp segment outer surface diameter and, thus, the activation state of the internal clamp assembly 86 may be controlled at least in part by controlling the position of its one or more wedged clamp segments 86 on the coned bore insert 90A. In particular, in some embodiments, moving a wedged clamp segment 95 to cover less of the coned bore insert 90A may result in the clamp segment outer surface diameter contracting inwardly and, thus, the internal clamp assembly 86 transitioning away from its activated state. Furthermore, as described above, in some embodiments, a wedged clamp segment 95, which is coupled between a coned bore insert 90A and an internal threaded fastener 101, may be moved (e.g., forced) away from the coned bore insert 90A at least in part by loosening the internal threaded fastener 101 from port threading 106 (e.g., internal port threading 106B) on the testing port 82 that matingly interfaces with internal fastener threading 112 on the internal threaded fastener 101. In other words, in such embodiments, transitioning the internal clamp assembly 86 away from its activated state may include loosening the internal threaded fastener 101 from the testing port 82, for example, at least in part by rotationally actuating the internal threaded fastener 101 in a second (e.g., counter-clockwise) direction relative to the testing port 82 (process block 210).

As described above, since the clamp segment outer surface diameter of the internal clamp assembly 86 may be less than the tubing inner surface diameter of the pipe segment 20 while in a deactivated state, one or more wedged clamp segments 95 of the internal clamp assembly 86 may be disengaged from the pipe segment 20 and, thus, exert less resistance to movement of the pipe segment 20. As such, the internal clamp assembly 86 as well as the testing port 82 and the coned bore insert 90A may be removed (e.g., withdrawn) from within the pipe bore 32 of the pipe segment 20 while the internal clamp assembly 86 is in a deactivated state (process block 204). In this manner, a reusable test head 76 may be selectively removed from a pipe segment 20.

In fact, returning to the process 62 of FIG. 5, in some embodiments, the reusable test head 76 may then be used to test the integrity of another pipe segment 20 and, thus, secured to the tubing 22 of the other pipe segment 20, for example, in accordance with the process 150 of FIG. 11 (arrow 212). Merely as an illustrative non-limiting example, implementing and/or operating a reusable test head in accordance with the techniques described in the present disclosure may enable the reusable test head to be secured to a first pipe segment to test integrity of its tubing, removed from the first pipe segment after completing a testing cycle for the first pipe segment, secured to a second (e.g., different) pipe segment to test integrity of its tubing, and so on. Thus, at least in some instances, implementing and/or operating a (e.g., reusable) test head in accordance with the techniques described in the present disclosure may facilitate improving testing efficiency of a pipeline system, for example, by obviating the use of a new (e.g., different) test head for testing each pipe segment deployed or to be deployed in the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   a pipe segment, wherein the pipe segment comprises tubing that defines a pipe bore and a fluid conduit implemented in an annulus of the tubing; and
   a test head comprising:
      a shell that defines an annulus cavity configured to interface with the annulus of the tubing, wherein the shell comprises an end cap and a bore insert having a male taper configured to be inserted into the pipe bore defined by the tubing of the pipe segment;
      a testing port configured to extend through the shell of the test head and to be fluidly coupled to the annulus cavity of the test head;
      an internal clamp assembly comprising one or more clamp segments having a female taper configured to slidably interface with the male taper of the bore insert, wherein an outer surface diameter of the one or more clamp segments is configured to be controlled by position of the one or more clamp segments on the bore insert of the shell to facilitate selectively securing and sealing an open end of the pipe segment in the test head to enable integrity of the tubing to be tested at least in part by flowing a test fluid into the fluid conduit implemented in the annulus of the tubing via the testing port;
      an internal threaded fastener, wherein:
         the internal threaded fastener comprises fastener threading configured to matingly interface with port threading on the testing port;
         the one or more clamp segments are configured to be coupled between the internal threaded fastener and the bore insert of the shell; and
         the test head is configured to:
            move the one or more clamp segments to cover more of the bore insert when the internal threaded fastener is rotationally actuated in a first direction relative to the testing port; and
            move the one or more clamp segments to cover less of the bore insert when the internal threaded fastener is rotationally actuated in a second direction relative to the testing port that is opposite the first direction; and
      an external threaded fastener, wherein:
         the external threaded fastener comprises other fastener threading configured to matingly interface with other port threading on the testing port;
         the testing port comprises a port ledge between the port threading and the other port threading; and
         the end cap of the shell is configured to be coupled between the external threaded fastener and the port ledge on the testing port.

2. The system of claim 1, wherein the one or more clamp segments are configured to have:
   a first outer surface diameter that is less than a default inner surface diameter of the tubing of the pipe segment while the one or more clamp segments are at a first position on the bore insert of the shell; and
   a second outer surface diameter that is not less than the default inner surface diameter of the tubing of the pipe segment while the one or more clamp segments are at a second position on the bore insert that is different from the first position.

3. The system of claim 2, wherein the system is configured to:
   maintain the one or more clamp segments at the first position on the bore insert of the shell while pipe segment tubing is not present in the annulus cavity of the test head; and
   transition the one or more clamp segments from the first position to the second position on the bore insert when the tubing of the pipe segment is present in the annulus cavity to facilitate securing and sealing the open end of the pipe segment in the test head.

4. The system of claim 3, wherein the system is configured to:
   perform an integrity test on the tubing of the pipe segment at least in part by flowing the test fluid into the fluid conduit implemented in the annulus of the tubing while the open end of the pipe segment is sealed and secured in the test head; and
   transition the one or more clamp segments from the second position to the first position on the bore insert of the shell after the tubing of the pipe segment has passed the integrity test to enable the test head to be removed from the open end of the pipe segment.

5. The system of claim 1, wherein:
   the bore insert of the shell comprises a cone-shaped axial cross-section profile; and
   a clamp segment of the one or more clamp segments comprises a wedge-shaped axial cross-section profile.

6. The system of claim 1, wherein:
the one or more clamp segments comprise a plurality of clamp segments; and
the internal clamp assembly comprises:
   a garter belt that runs circumferentially along an outer surface of the plurality of clamp segments; and
   a clamp activation plate configured to be coupled between the plurality of clamp segments and the internal threaded fastener.

7. The system of claim 1, comprising another pipe segment, wherein:
the other pipe segment comprises another tubing that defines another pipe bore and another fluid conduit implemented in another annulus of the other tubing; and
the system is configured to:
   secure and seal the open end of the pipe segment in the test head during a first time period to enable integrity of the tubing of the pipe segment to be tested at least in part by flowing the test fluid into the fluid conduit implemented in the annulus of the tubing; and
   secure and seal another open end of the other pipe segment in the test head during a second time period that is non-overlapping with the first time period to enable integrity of the other tubing of the other pipe segment to be tested at least in part by flowing the test fluid into the other fluid conduit implemented in the other annulus of the other tubing.

8. A method, comprising:
inserting a testing port and a portion of a shell of a test head into a pipe bore defined by pipe segment tubing, wherein the portion of the shell comprises a coned bore insert and the pipe segment tubing comprises a fluid conduit implemented in an annulus of the pipe segment tubing;
maintaining a reusable fastener mechanism of the test head in a deactivated state while the reusable fastener mechanism is being inserted into the pipe bore defined by the pipe segment tubing at least in part by maintaining wedged clamp segments of the reusable fastener mechanism at a first position on the coned bore insert;
transitioning the reusable fastener mechanism from the deactivated state to an activated state to facilitate securing an open end of the pipe segment tubing in an annulus cavity defined by the shell of the test head at least in part by rotating an internal threaded fastener that has fastener threading that matingly interfaces with port threading on a testing port that opens through the shell of the test head in a first direction relative to the testing port to facilitate transitioning the wedged clamp segments from the first position to a second position on the coned bore insert that results in the wedged clamp segments covering more of the coned bore insert;
securing an end cap of the shell between a port ledge on the testing port and an external threaded fastener that has other fastener threading that matingly interfaces with other port threading on the testing port at least in part by rotating the external threaded fastener in the first direction relative to the testing port, wherein the port ledge is between the port threading and the other port threading on the testing port;
testing of the pipe segment tubing based at least in part on a fluid parameter change resulting from supply of a test fluid to the fluid conduit in the annulus of the pipe segment tubing via the testing port that opens through the shell of the test head; and
transitioning the reusable fastener mechanism from the activated state to the deactivated state to facilitate removing the test head from the pipe segment tubing at least in part by rotating the internal threaded fastener in a second direction relative to the testing port that is opposite the first direction to facilitate transitioning the wedged clamp segments from the second position to the first position or a third position on the coned bore insert that results in the wedged clamp segments covering less of the coned bore insert.

9. The method of claim 8, comprising unsecuring the end cap of the shell from the testing port to facilitate removing the test head from the pipe segment tubing at least in part by rotating the external threaded fastener in the second direction relative to the testing port.

10. A reusable test head comprising:
a shell that defines an annulus cavity configured to interface with pipe segment tubing, wherein the shell comprises:
   a coned bore insert configured to be inserted into a pipe bore defined by the pipe segment tubing; and
   an end cap configured to externally cover an open end of the pipe segment tubing;
a plurality of wedged clamp segments configured to slidably interface with the coned bore insert of the shell;
a testing port configured to be fluidly coupled to the annulus cavity of the reusable test head, wherein:
   the testing port comprises port tubing configured to extend through an opening between the plurality of wedged clamp segments, the coned bore insert, and the end cap; and
   the reusable test head is configured to expand an outer surface diameter of the plurality of wedged clamp segments outwardly when the plurality of wedged clamp segments is moved to cover more of the coned bore insert to facilitate securing the open end of the pipe segment tubing in the annulus cavity to enable integrity of the pipe segment tubing to be tested at least in part by flowing fluid between the testing port and a fluid conduit implemented within the pipe segment tubing;
an internal threaded fastener, wherein:
   the internal threaded fastener comprises fastener threading configured to matingly interface with port threading on the testing port;
   the plurality of wedged clamp segments is configured to be coupled between the coned bore insert and the internal threaded fastener; and
   the reusable test head is configured to:
      move the plurality of wedged clamp segments to cover more of the coned bore insert when the internal threaded fastener is rotationally actuated in a first direction relative to the testing port; and
      move the plurality of wedged clamp segments to cover less of the coned bore insert when the internal threaded fastener is rotationally actuated in a second direction relative to the testing port that is opposite the first direction; and
an external threaded fastener, wherein:
   the external threaded fastener comprises other fastener threading configured to matingly interface with other port threading on the testing port;
   the testing port comprises a port ledge between the port threading and the other port threading; and the end cap is configured to be coupled between the external threaded fastener and the port ledge on the testing port.

11. The reusable test head of claim 10, wherein the reusable test head is configured to contract an inner surface diameter of the plurality of wedged clamp segments inwardly when the plurality of wedged clamp segments is moved to cover less of the coned bore insert to enable the open end of the pipe segment tubing to be inserted into the annulus cavity, withdrawn from the annulus cavity, or both.

12. The reusable test head of claim 10, comprising:
a garter belt that runs circumferentially around an outer surface of the plurality of wedged clamp segments; and
a clamp activation plate configured to be coupled between the plurality of wedged clamp segments and the internal threaded fastener.

* * * * *